(12) United States Patent
Carbonell et al.

(10) Patent No.: US 9,162,223 B2
(45) Date of Patent: Oct. 20, 2015

(54) ALKALINE-STABLE CHROMATOGRAPHIC RESINS

(71) Applicant: NORTH CAROLINA STATE UNIVERSITY, Raleigh, NC (US)

(72) Inventors: Ruben G. Carbonell, Raleigh, NC (US); Stefano Menegatti, Willow Spring, NC (US); Amith D. Naik, Raleigh, NC (US)

(73) Assignee: North Carolina State University, Raleigh, NC (US)

(*) Notice: Subject to any disclaimer, the term of this patent is extended or adjusted under 35 U.S.C. 154(b) by 0 days.

(21) Appl. No.: 13/724,245

(22) Filed: Dec. 21, 2012

(65) Prior Publication Data

US 2013/0165539 A1 Jun. 27, 2013

Related U.S. Application Data

(60) Provisional application No. 61/578,374, filed on Dec. 21, 2011.

(51) Int. Cl.
| | |
|---|---|
| *B01J 39/26* | (2006.01) |
| *B01J 20/286* | (2006.01) |
| *B01D 15/38* | (2006.01) |
| *B01J 20/32* | (2006.01) |

(52) U.S. Cl.
CPC .............. *B01J 39/26* (2013.01); *B01D 15/3804* (2013.01); *B01J 20/286* (2013.01); *B01J 20/3251* (2013.01); *B01J 20/3272* (2013.01)

(58) Field of Classification Search
USPC ................................. 521/30, 31; 530/387.1
See application file for complete search history.

(56) References Cited

U.S. PATENT DOCUMENTS

| | | | | |
|---|---|---|---|---|
| 5,169,935 | A | * | 12/1992 | Hoeger et al. ............... 530/328 |
| 5,783,663 | A | | 7/1998 | Mondorf |
| 5,877,278 | A | * | 3/1999 | Zuckermann et al. ........ 530/334 |
| 5,985,836 | A | | 11/1999 | Bastek |
| 6,191,256 | B1 | | 2/2001 | Chen |
| 7,408,030 | B2 | | 8/2008 | Carbonell |
| 7,863,411 | B2 | | 1/2011 | Hammond |

OTHER PUBLICATIONS

Menegatti et al., (2012), "Alkaline-stable peptide ligand affinity adsorbents for the purification of biomolecules," J. Chrom. A, 1245, 55-64.*

Bak et al., (1999), "Synthesis and evaluation of the physicochemical properties of esterase-sensitive cyclic prodrugs of opiod peptides using an (acyloxy) alkoxy linker," J. Pept Res., 53, 393-402.

Gregori et al., (2006), "Reduction in infectivity of endogenous transmissible spongiform encephalopathies present in blood by adsorption to selective affinity resins," Lancet, 368, 2226-2230.

Huang & Carbonell, (1999), "Affinity chromatographic screening of soluble combinatorial peptide libraries, biotechnology and bioengineering," 63, No. 6, 633-641.

(Continued)

*Primary Examiner* — Peter D Mulcahy
*Assistant Examiner* — Henry Hu
(74) *Attorney, Agent, or Firm* — Michael Best & Friedrich LLP

(57) ABSTRACT

This invention is directed to the production of improved chromatographic resins and method of making and using such resins.

12 Claims, 8 Drawing Sheets

(56) References Cited

OTHER PUBLICATIONS

Figure 1A:
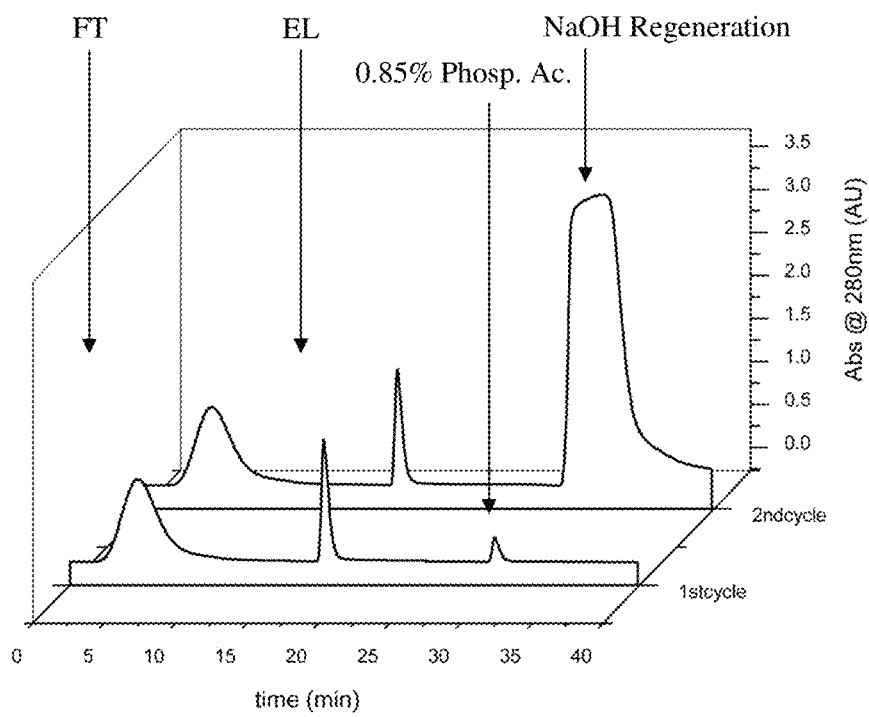

Huang & Carbonell, (1995), "Affinity purification of proteins using ligands derived from peptide libraries," Biotechnology & Bioengineering, 47, 288-297.

Huang et al., (1996), "Affinity purification of von Willebrand Factor using ligands derived from peptide libraries," Bioorganic & Medicinal Chemistry, 4 No. 5, 699-708.

Isidro-Llobet et al., (2009), "Amino acid-protecting groups," Chem. Rev., 109, 2455-2504.

Kaufman et al., (2002), "Affinity purification of fibrinogen using a ligand from a peptide library," Biotechnology & Bioengineering, 77 No. 3, 278-289.

Linhult et al., (2004), "Improving the tolerance of a Protein A analogue to repeated alkaline exposures using a bypass mutagenesis approach," Proteins, 55, 407-416.

Liu, Carbonell, (2011), "Effects of peptide density and elution pH on affinity chromatographic purification of human immunoglobulins A and M," J. Chrom. A, 1218, 8344-8352.

Liu, Carbonell, (2012), "Purification of human immunoglobulins A, G and M from Cohn fraction II/III by small peptide affinity chromatography," J. Chrom. A, 1262, 169-179.

Low et al., (2007), "Future of antibody purification," J. Chrom. B, 848, 48-63.

Lowe, (2001), "Combinatorial approaches to affinity chromatography," Curr. Opin. Chem. Biol., 5, 248-256.

Menegatti et al., (2012), "mRNA display selection and solid-phase synthesis of Fc-binding cyclic peptide affinity ligands," Biotech & Bioeng Online, Oct. 25, 2012, 1-37.

Menegatti et al., (2012), "Purification of polyclonal antibodies from Cohn fraction II + III, skim milk, and whey by affinity chromatography using a hexamer peptide ligand," J. Sep. Sci., 35, 3139-3148.

Naik et al., (2011), "Performance of hexamer peptide ligands for affinity purification of immunoglobulin G from commercial cell culture media," J. Chrom. A, 1218, 1691-1700.

Roque et al., (2004), "Antibodies and genetically engineered related molecules: production and purification," Biotechnol. Prog., 20, 639-654.

Roque et al., (2007), "Affinity-based methodologies and ligands for antibody purification: advances and perspectives," J. Chrom. A, 1160, 44-55.

Wang et al., (2004), "A hexamer peptide ligand that binds selectively to staphylococcal enterotoxin B: isolation from a solid phase combinatorial library," J. Pept. Res., 64, 51-64.

Wang et al., (2005), "Characterization of a peptide affinity support that binds selectively to staphylococcal enterotoxin B," J. Chrom. A, 1078, 98-112.

Yang et al., (2010), "Binding site on human immunoglobulin G for the affinity ligand HWRGWV," J. Mol. Recognit., 23, 271-282.

Yang et al., (2009), "Purification of human immunoglobulin G via Fc-specific small peptide ligand affinity chromatography," J. Chrom. A, 1216, 910-918.

Yang et al., (2006), "Hexamer peptide affinity resins that bind the Fc region of human immunoglobulin G," J. Peptide Res., 66 (Suppl. 1), 120-137.

* cited by examiner

SEQUENCE LISTING

```
<160> NUMBER OF SEQ ID NOS: 3

<210> SEQ ID NO 1
<211> LENGTH: 6
<212> TYPE: PRT
<213> ORGANISM: Unknown
<220> FEATURE:
<223> OTHER INFORMATION: Synthetic sequence

<400> SEQUENCE: 1

His Trp Arg Gly Trp Val
1               5

<210> SEQ ID NO 2
<211> LENGTH: 6
<212> TYPE: PRT
<213> ORGANISM: Unknown
<220> FEATURE:
<223> OTHER INFORMATION: Synthetic sequence

<400> SEQUENCE: 2

His Tyr Phe Lys Phe Asp
1               5

<210> SEQ ID NO 3
<211> LENGTH: 6
```

```
<212> TYPE: PRT
<213> ORGANISM: Unknown
<220> FEATURE:
<223> OTHER INFORMATION: Synthetic sequence

<400> SEQUENCE: 3

His Phe Arg Arg His Leu
1               5
```

ALKALINE-STABLE CHROMATOGRAPHIC RESINS

CROSS REFERENCE TO RELATED APPLICATIONS

This application claims the benefit of U.S. Ser. No. 61/578,374 filed Dec. 21, 2011, Carbonell et al., which is hereby incorporated by reference in its entirety.

1. FIELD OF THE INVENTION

This invention relates generally to the production of improved chromatographic resins and method of making and using such resins.

2. BACKGROUND OF THE INVENTION

2.1. Introduction

Biopharmaceuticals are a very important class of therapeutics for the treatment of a vast array of diseases. These products, however, are very expensive and thus unaffordable by most of the population both in the U.S. and worldwide. Much of the high cost is due to the purification processes (downstream processing), which account for over 50% of the overall manufacturing costs. A. C. A. Roque, C. S. O. Lowe and M. A. Taipa, *Biotechnol. Prog.* 20 (2004) 639-654.

Chromatography is central in downstream processing of biologics, as it is a scalable technique that has the ability to achieve the high purity standards required by the regulatory authorities for commercial bioproducts. G. Sofer, *J. Chromatogr. A* 707 (1995) 23. Among the different types of chromatography, affinity chromatography has a very high potential for the selective purification of therapeutic proteins. In order to be applied on the industrial scale, an affinity adsorbent should be characterized by high binding capacity and specificity, low cost and high chemical resistance toward the treatments of cleaning-in-place (CIP) and sanitization-in-place (SIP) periodically performed to ensure its safe reusability. G. Jagschies, Process-Scale Chromatography, *Ullmann's Encyclopedia of Industrial Chemistry* (2000). The industrial standard for CIP and SIP of chromatographic media is aqueous NaOH (0.1M-1M), as it is the most cost effective agent in eliminating bacteria, endotoxins, viruses and does not present any environmental disposal problems. M. Linhult, S. Gulich, S. Hober, *Protein Pept. Lett.* 12 (2005) 305; GE Healthcare Application Note: Use of sodium hydroxide for cleaning and sanitizing chromatography media and systems. (Code No. 18-1124-57 AG). However, to date, most widely used affinity ligands suffer from chemical instability towards these procedures.

Among the therapeutic proteins, monoclonal antibodies (mAbs) are an important class of biologics for the treatment of diseases such as cancer, skin disorders, neurological disorders and other autoimmune diseases. They account for 43% of total market value of therapeutic proteins. Strohl W. R. and Knight D. M., (2009) Discovery and development of biopharmaceuticals: current issues. *Curr. Opin. Biotechnol.* 20, 668-672. However, the manufacture of mAb-based biologics is affected by several drawbacks related to the use of Protein A and Protein G affinity chromatography. First, the high price of Protein A and Protein G affinity media impacts significantly on the overall manufacturing costs. Also, these media bind very strongly to the antibodies, thus requiring the application of harsh elution conditions, which can result in reduced activity and/or yield of the product. Moreover, these conditions can cause the formation of antibody aggregates that can be immunogenic, so that careful monitoring is required for process validation.

In addition, repeated cycles of binding and elution, together with periodic cleaning and sanitization of the resin with 0.1-1N NaOH, can denature the tertiary structures of Protein A and Protein G, thereby decreasing the binding affinity and resin lifetime, and causing the release of immunogenic leachates in the mainstream. Lowe, C. R. (2001) Combinatorial approaches to affinity chromatography, *Curr. Opin. Chem. Biol.* 5, 248-256. D. K. Follman, R. L. Fahrner, *J. Chromatogr. A* 1024 (2004) 79; G. Hale, A. Drumm, P. Harrison, J. Phillips, *J. Immunol. Methods* 171 (1994), 15; T. Ishihara, T. Kadoya, N. Endo, S. Yamamoto, *J. Chromatogr. A* 1114 (2006) 97; P. Gagnon, Purification Tools for Monoclonal Antibodies, Validated Biosystems (1996); J. W. Bloom, M. F. Wong, G. Mitra, *J. Immunol. Methods* 117 (1989) 83; K. Brorson, J. Brown, E. Hamilton, K. E. Stein, *J. Chromatogr. A* 989 (2003) 115. Although engineered versions of Protein A and Protein G for greater stability exist, they are also more expensive. Furthermore, the above discussed issues of stability and harsh elution conditions remain a concern. Gulich S., Linhult M., Stahl S., and Hober S. (2002) Engineering streptococcal Protein G for increased alkaline stability, *Protein Eng.* 15, 835-842; Linhult M., Gulich S., Graslund T., Simon A., Karlsson M., Sjoberg A., Nord K., and Hober S. (2004) Improving the tolerance of a Protein A analogue to repeated alkaline exposures using a bypass mutagenesis approach, *Proteins,* 55, 407-416.

To address these concerns, academia and industry have tried to develop synthetic, efficient and less costly affinity ligands for antibodies. Some of these have been well characterized and even commercialized, such as the (i) hydrophobic charge induced ligand MEP (4-mercapto ethyl pyridine) marketed as BioSepra® MEP HyperCel® (Boschetti E. (2001) The use of thiophilic chromatography for antibody purification: a review, *J. Biochem. Biophys. Methods* 49, 361-389; Schwartz W., Judd D., Wysocki M., Guerrier L., Birck-Wilson E. and Boschetti E. (2001) Comparison of hydrophobic charge induction chromatography with affinity chromatography on Protein A for harvest and purification of antibodies. *J. Chromatogr., A* 908, 251-263; Boschetti E. (2002) Antibody separation by hydrophobic charge induction chromatography, *Trends Biotechnol.* 20, 333-337; Guerrier L., Flayeux I., and Boschetti E. (2001) A dual-mode approach to the selective separation of antibodies and their fragments, *J. Chromatogr. B.* 755, 37-46; and Guerrier L., Girot P., Schwartz W., and Boschetti E. (2000) New method for the selective capture of antibodies under physiological conditions, *Bioseparation* 9, 211-2210), (ii) the Protein A mimetic peptide Kaptiv-GY based on the sequence (RTY)4K2KG (TG19318) (Verdoliva A., Pannone F., Rossi M., Catello S., and Manfredi V. (2002) Affinity purification of polyclonal antibodies using a new all-D synthetic peptide ligand: comparison with Protein A and Protein G, *J. Immunol. Methods* 271, 77-88; Fassina G., Verdoliva A., Palombo G., Ruvo M., and Cassani G. (1998) Immunoglobulin specificity of TG19318: a novel synthetic ligand for antibody affinity purification, *J. Mol. Recognit.* 11, 128-133; and Fassina G., Ruvo M., Palombo G., Verdoliva A., and Marino M. (2001) Novel ligands for the affinity-chromatographic purification of antibodies, *J. Biochem. Biophys. Methods* 49, 481-490), (iii) the mixed-mode chromatographic ligand FastMabs A (Lihme A., and Hansen M. B. (2002) Isolation of immunoglobulins, Upfront Chromatography A/S (Copenhagen, DK); and Hansen M. B., Lihme A., Spitali M., and King D. (1998) Capture of human Fab fragments by expanded bed adsorption with a mixed mode adsorbent, *Bioseparation* 8, 189-193), and (iv) the MAbSorbent A2P derived from a triazine derivative 22/8 (Teng S. F., Sproule K., Husain A., and Lowe C. R. (2000) Affinity chromatography on immobilized "biomimetic" ligands synthesis, immobilization and chromatographic assessment of an immunoglobulin G-binding ligand, *J. Chromatogr. B.* 740, 1-15; and Newcombe A. R., Cresswell C., Davies S., Watson K., Harris G., O'Donovan K., and Francis R. (2005) Optimized affinity purification of polyclonal antibodies from hyper immunized ovine serum using a synthetic Protein A adsorbent, MAbSorbent® A2P, *J. Chromatogr. B. Biomed. Sci. Appl.* 814, 209-215). Nevertheless, these small ligands have not replaced much of the market for Protein A affinity chromatography, primarily due to their lack of specificity, and the search for new ligands to be used in antibody purification is still quite intensive in both industry and academia. Feng H. Q., Jia L. Y., Li H. L., and Wang X. C. (2006) Screening and chromatographic assessing of a novel IgG biomimetic ligand, *Biomed. Chromatogr.* 20, 1109-1115. Specifically, attempts have been made over the last two decades to develop specific, chemically robust and cost-effective synthetic ligands. K. Sproule, P. Morrill, J. C. Pearson, S. J. Burton, K. R. Hejnaes, H. Valore, S. Ludvigsen, C. R. Lowe, *J. Chromatogr. B* 740 (2000) 17; A. C. A. Roque, C. S. O, Silva, M. A. Taipa, *J. Chromatogr. A* 1160 (2007) 44; C. R. Lowe, *Curr. Opin. Chem. Biol.* 5 (2001) 248. In particular, peptide ligands are of great interest due to their high specificity and stability and low cost compared to protein ligands.

Several peptide ligands for the purification of biomolecules from complex media have been identified. P. D. Bastek, J. M. Land, G. A. Baumbach, D. H. Hammond, R. G. Carbonell, *Separation Sci. Technol.* 35 (2000) 1681; P. V. Gurgel, R. G. Carbonell, H. E. Swaisgood, *Sep. Sci. Technol.* 36 (2001) 2411; G. Q. Wang, J. De, J. S. Schoeniger, D. C. Roe, R. G. Carbonell, *J. Pept. Res.* 64 (2004) 51; D. B. Kaufman, M. E. Hentsch, G. A. Baumbach, J. A. Buettner, C. A. Dadd, P. Y. Huang, D. H. Hammond, R. G. Carbonell, *Biotechnol. Bioeng.* 77 (2002) 278; C. L. Heldt, P. V. Gurgel, L. Jaykus and R. G. Carbonell, *Biotechnol. Prog.* 24 (2008) 554. Three linear hexapeptide ligands HWRGWV, HYFKFD and HFR-RHL (SEQ ID NO: 1-3) were discovered that bind human IgG through its Fc portion, thus mimicking the binding mechanism of Protein A. H. Yang, P. V. Gurgel, R. G. Carbonell, *J. Pept. Res.* 66 (2005) 120; H. Yang, P. V. Gurgel, and R. G. Carbonell, *J. Chromatogr. A* 1216 (2009) 910. These hexapeptide ligands capture monoclonal and polyclonal antibodies from diverse sources demonstrating performances comparable to those offered by Protein A and Protein G. A. D. Naik, S. Menegatti, P. V. Gurgel, and R. G. Carbonell, *J. Chromatogr. A* 1218 (2011) 1691.

In a separate study, MS analysis of protease digests of the Fc fragment of hIgG revealed a putative binding sequence for HWRGWV (SEQ ID NO: 1) on the pFc segment which was found to be distinct from the Protein A and Protein G binding sites. Yang H., Gurgel P. V., Williams K., Bobay B., Cavanagh J., Muddiman D., and Carbonell R. G. (2009) Binding site on human immunoglobulin G for affinity ligand HWRGWV, *J. Mol. Recognit.*, 23, 271-282. This result was consistent with the observation that the peptide HWRGWV (SEQ ID NO: 1) did not compete with either Protein A or Protein G for hIgG binding. Recent work has demonstrated that the ligand HWRGWV (SEQ ID NO: 1) is able to capture and purify commercial chimeric and humanized antibodies from industrial mammalian cell culture supernatants that include antifoam, host cell proteins, DNA, RNA, vitamins and many other contaminants. The antibody concentration of these cell cultures was slightly above 1 g/L and the yield and purity upon elution from the HWRGWV (SEQ ID NO: 1) column were 80% and 97% respectively. Also, the ligand was able to achieve two logs reduction of host cell protein and DNA. These results were similar to those obtained with Protein G column A. D. Naik, S. Menegatti, P. V. Gurgel, and R. G. Carbonell, *J. Chromatogr. A* 1218 (2011) 1691. HWRGWV-Toyopearl affinity resin has a capacity of 20 g/L (Yang H. Gurgel P. V., and Carbonell R. G. (2009)) and can be cleaned in acid and denaturing conditions. However, experimental work has shown that these adsorbents do not withstand the alkaline conditions (0.1 M-0.5 M NaOH) used in CIP and SIP treatments. In fact, upon exposure to alkaline wash the peptide ligand is leached from the adsorbent, resulting in a significant loss of binding capacity.

Accordingly, there is an important commercial need for alkaline-stable affinity chromatography reagents.

3. SUMMARY OF THE INVENTION

In particular non-limiting embodiments, the present invention provides a method of preparing an alkaline-stable functionalized solid support which comprises: (a) contacting a solid support comprising hydroxyl groups and additional nucleophilic groups under suitable conditions with an alkaline-stable protected (i) biomonomer or (ii) biopolymer so as to form a coupled solid support; (b) reacting the coupled solid support under suitable conditions so as to cleave any alkaline-labile bonds formed between any hydroxyl groups and the alkaline-stable protected (i) biomonomer or (ii) biopolymer; (c) acylating the hydroxyl groups in the coupled solid support to form an acylated coupled solid support; (d) removing the alkaline-stable protecting group from the biomonomer or biopolymer to yield a deprotected biomonomer or biopolymer on the acylated coupled solid support; (e) contacting the acylated coupled solid support with suitable reagents so as to link at least one additional protected biomonomer or biopolymer to the deprotected biomonomer or biopolymer on the acylated coupled solid support; and (f) deacylating the acylated coupled solid support so as to form the alkaline-stable functionalized solid support.

The invention also provides a method of preparing an alkaline-stable functionalized solid support which comprises: (a) contacting a polyhydroxyl solid support with an activating agent so as to form an activated solid support; (b) contacting the activated solid support with a protected (i) biomonomer or (ii) biopolymer under suitable conditions so as to form a coupled solid support; (c) acylating any unreacted hydroxyl groups in the coupled solid support to form an acylated coupled solid support; (d) removing the protecting group from the biomonomer or biopolymer to yield a deprotected biomonomer or biopolymer on the acylated coupled solid support; (e) contacting the acylated coupled solid support with a suitable reagent so as to link at least one additional protected biomonomer or biopolymer to the deprotected biomonomer or biopolymer on the acylated coupled solid support; and (f) deacylating the acylated coupled solid support so as to form the alkaline-stable functionalized solid support.

The invention also provides solid supports prepared by the methods above and methods of purifying a biological using such solid supports.

4. BRIEF DESCRIPTION OF THE FIGURES

Figure 1B:
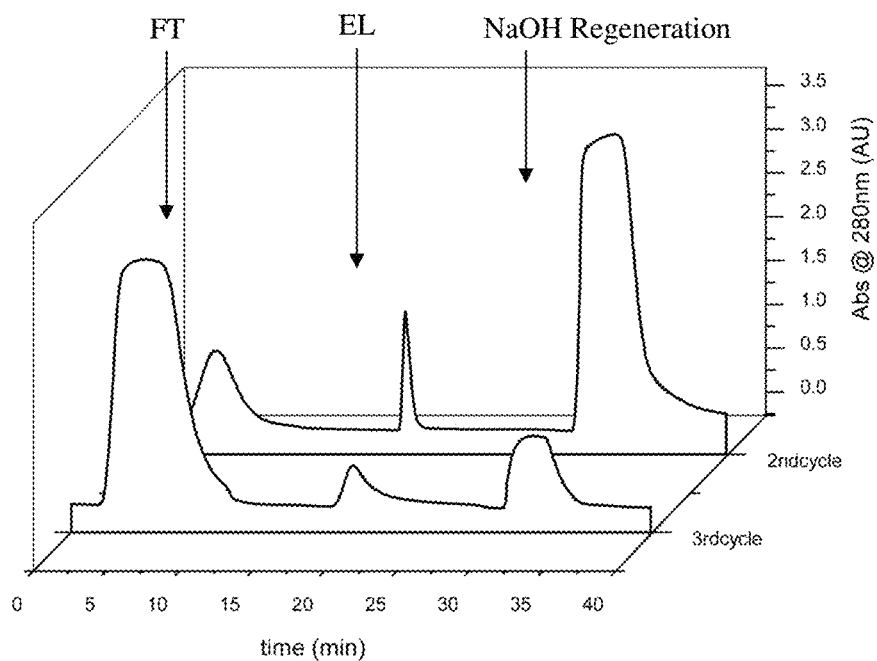
Figure 1C:
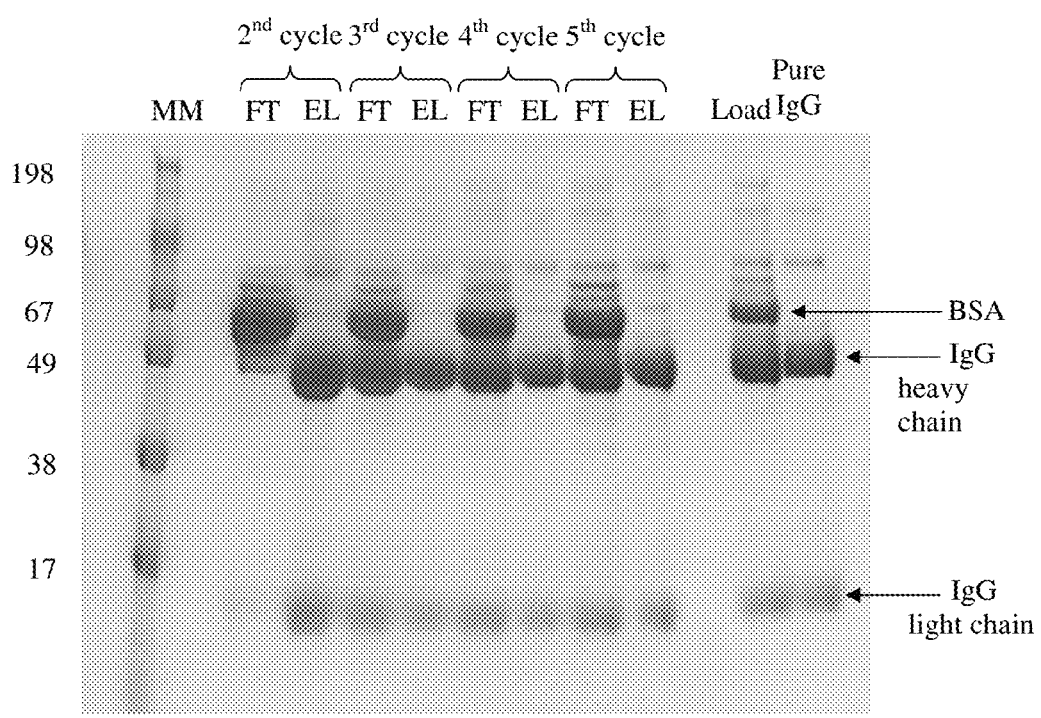

FIG. 1(A). Chromatograms of first two cycles of IgG purification from cMEM using HWRGWV-Toyopearl resin. The resin was regenerated with 0.85% phosphoric acid in the first cycle and with 0.1M NaOH in the second cycle. FIG. 1(B). Chromatograms of second and third cycle of IgG purification from cMEM using HWRGWV-Toyopearl resin with intermediate NaOH wash. FIG. 1(C). SDS-PAGE (reducing conditions) of flow-through and eluted fractions of IgG purification cycles using HWRGWV-Toyopearl resin with intermediate NaOH wash. Labels: MM—molecular weight marker, FT—flow-through fraction, EL—elution fraction.

Figure 2A:
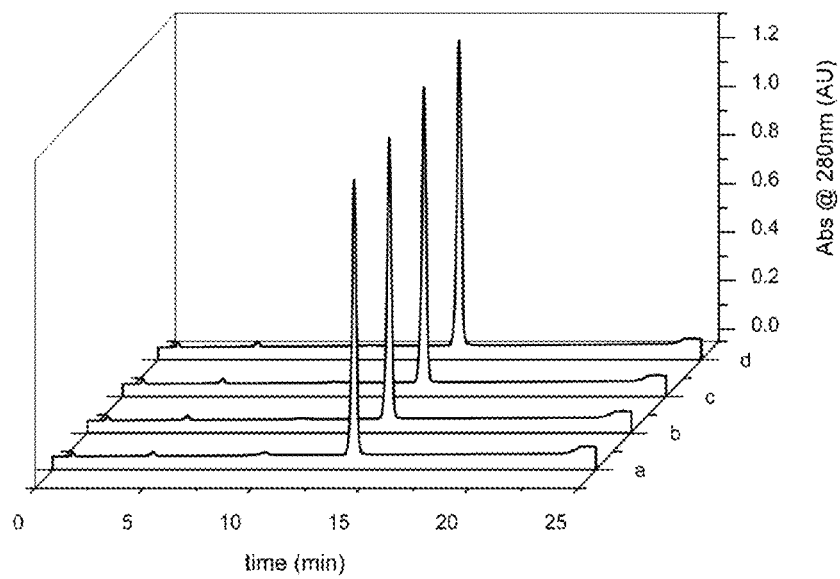
Figure 2B:
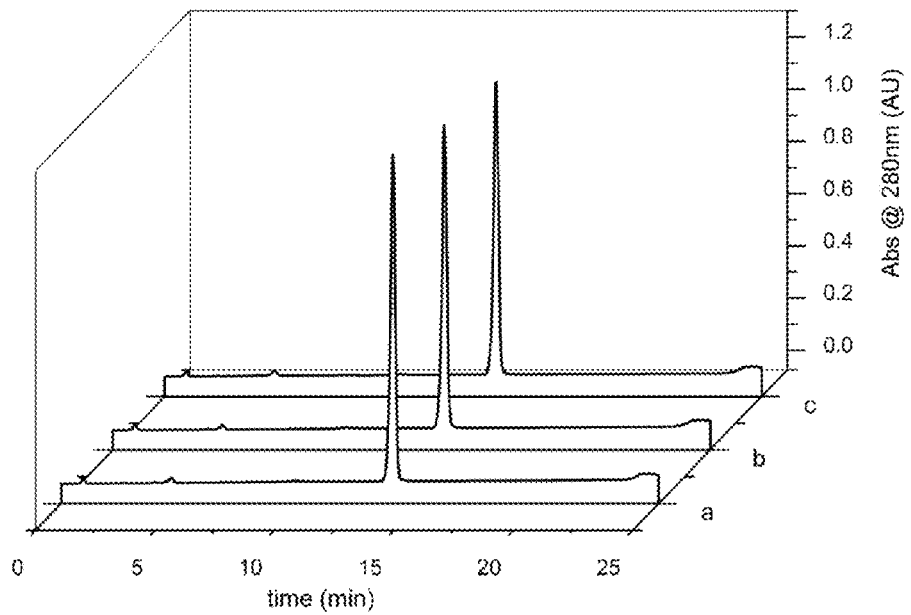

FIG. 2(A). C18 HPLC analysis of stability of pure peptide exposed to different concentrations of NaOH for 1 hour: a) 0.1 M NaOH, b) 0.5 M NaOH, c) 1 M NaOH, d) 0 M NaOH (control). FIG. 2(B). C18 HPLC analysis of stability of pure peptide exposed to different concentrations of NaOH for 2 hours: a) 0.5 M NaOH, b) 1 M NaOH, c) 0 M NaOH (control).

Figure 3:
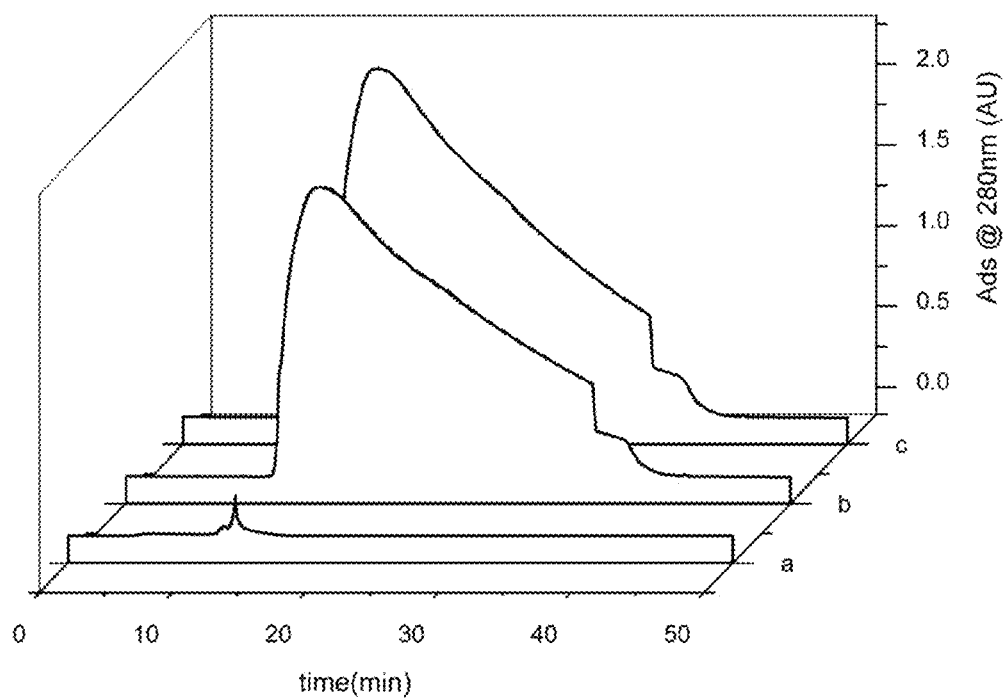

FIG. 3. Chromatograms of 0.1 M NaOH wash of tryptophan-coupled resin batches: plot (a) modified Toyopearl AF-Amino-650M; plot (b) modified but non-acetylated; plot (c) unmodified Toyopearl amino resin.

Figure 4:
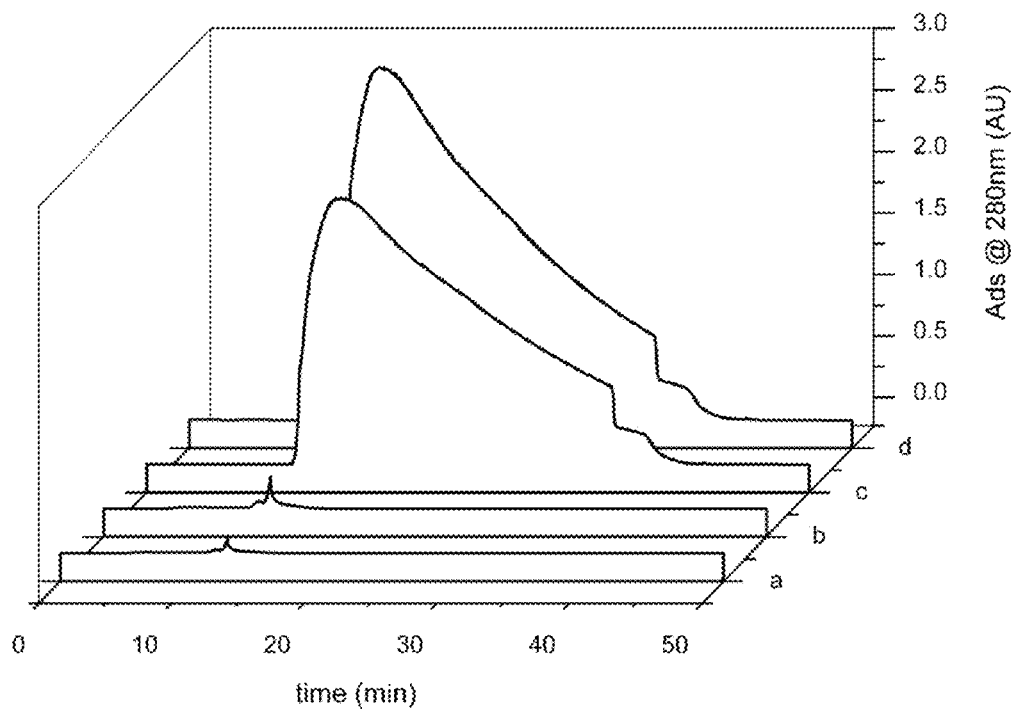

FIG. 4. Chromatograms of 0.1 M NaOH wash of tryptophan coupled resins: plot (a) modified Toyopearl HW-65F (batch a as per Section 6.3.5); plot (b) modified Toyopearl AF-Amino-650M (as per Section 6.3.4); plot (c) unmodified Toyopearl AF-Amino-650M resin (as per Section 6.3.4); plot (d) modified Toyopearl HW-65F without acetylation (batch b as per Section 6.3.5).

Figure 5:
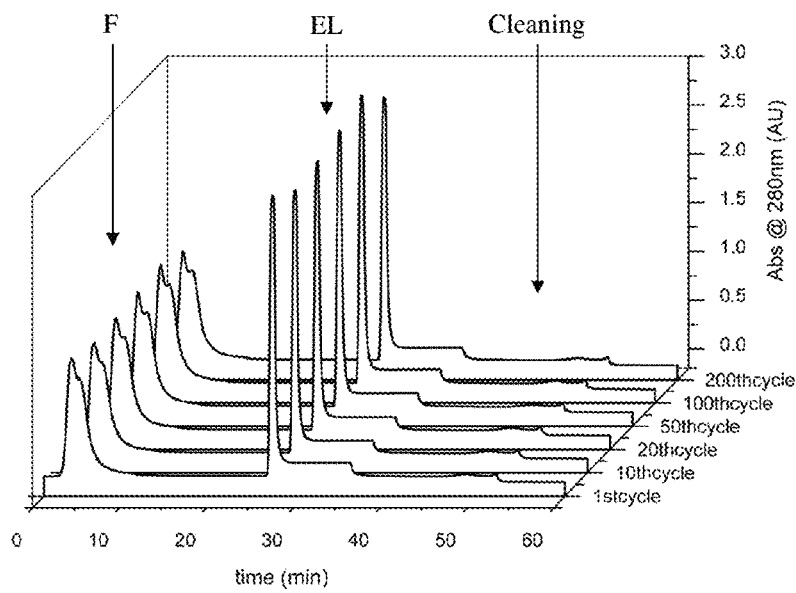
Figure 5B:
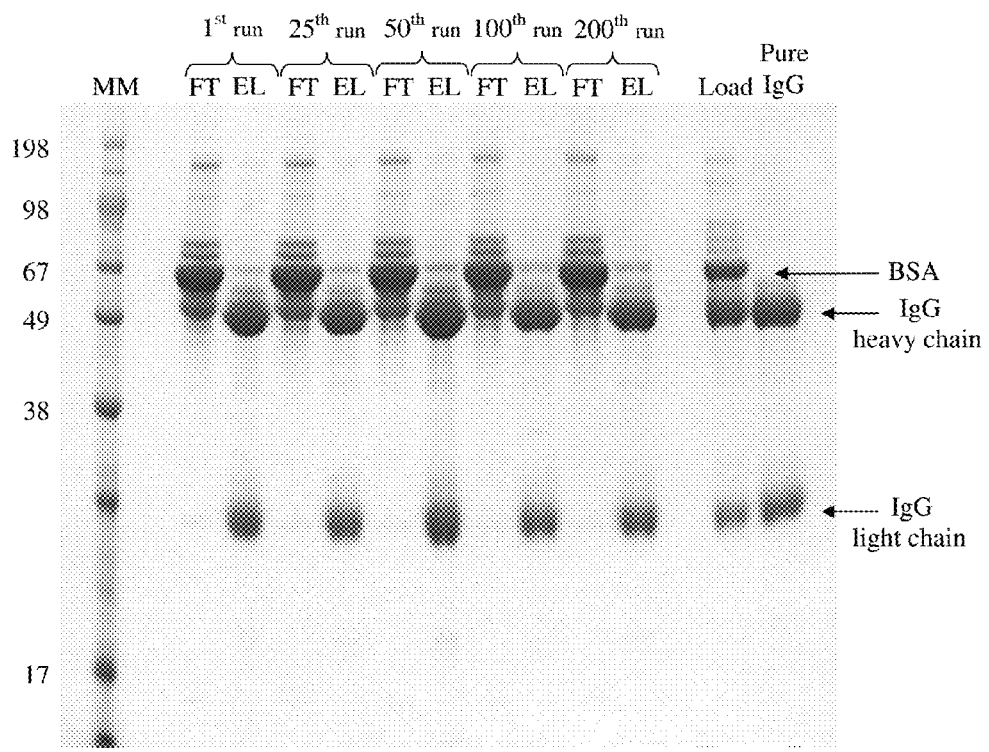

FIG. 5(A). Chromatogram of IgG purification runs using HWRGWV-Toyopearl resin with intermediate aqueous 0.1 M NaOH cleanings. FIG. 5(B). SDS-PAGE (reducing conditions) of flow-through and eluted fractions of IgG purification from cMEM at $1^{st}$, $25^{th}$, $50^{th}$, $100^{th}$ and $200^{th}$ cycles. Labels: MM—molecular weight marker, FT—flow-through fraction, EL—elution fraction.

Figure 6A:
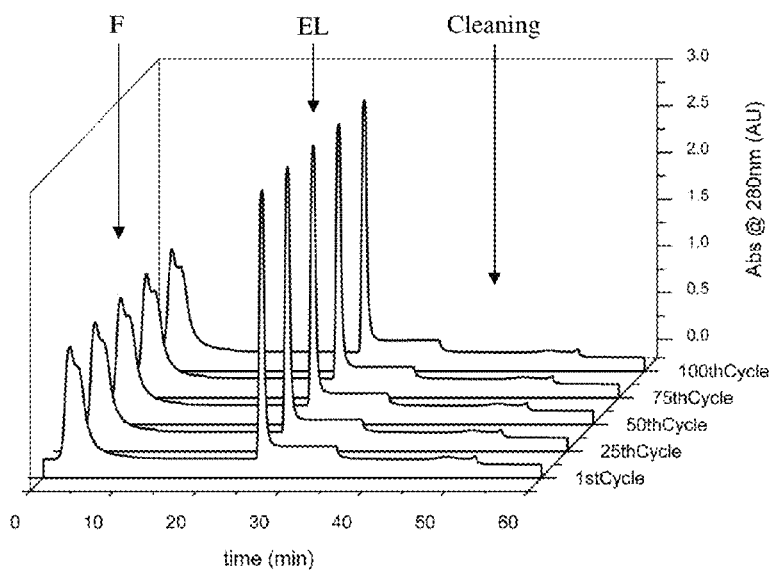
Figure 6B:
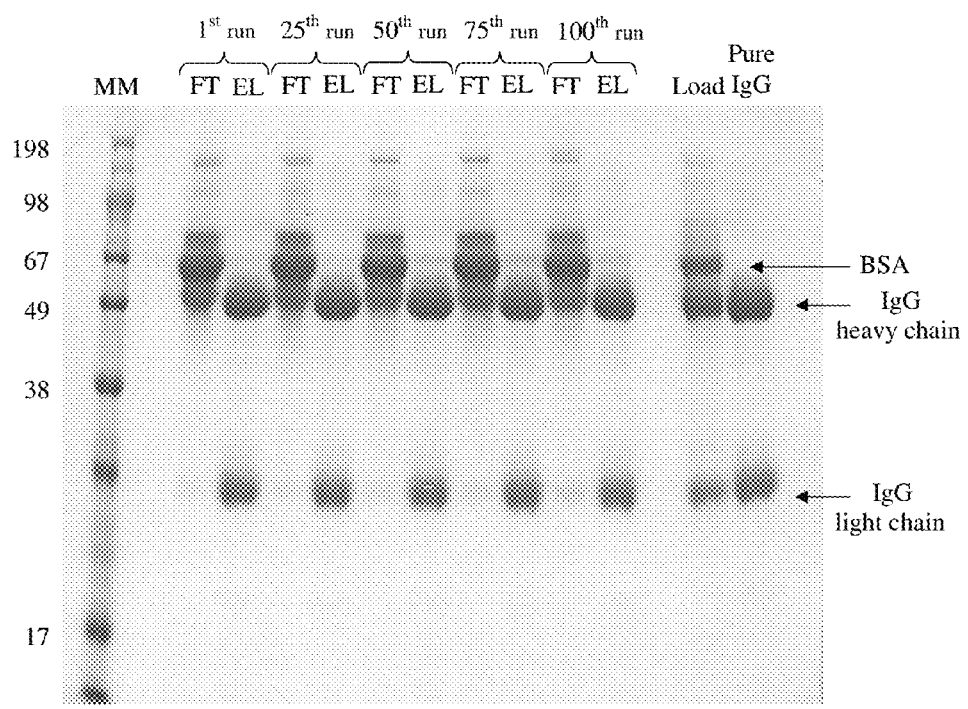

FIG. 6(A). Chromatogram of IgG purification runs using HWRGWV-Toyopearl resin with intermediate aqueous 0.5 M NaOH cleanings. FIG. 6(B). SDS-PAGE (reducing conditions) of flow-through and eluted fractions of IgG purification from cMEM at $1^{st}$, $25^{th}$, $50^{th}$, $75^{th}$ and $100^{th}$ cycles. Labels: MM—molecular weight marker, FT—flow-through fraction, EL—elution fraction.

Figure 7A:
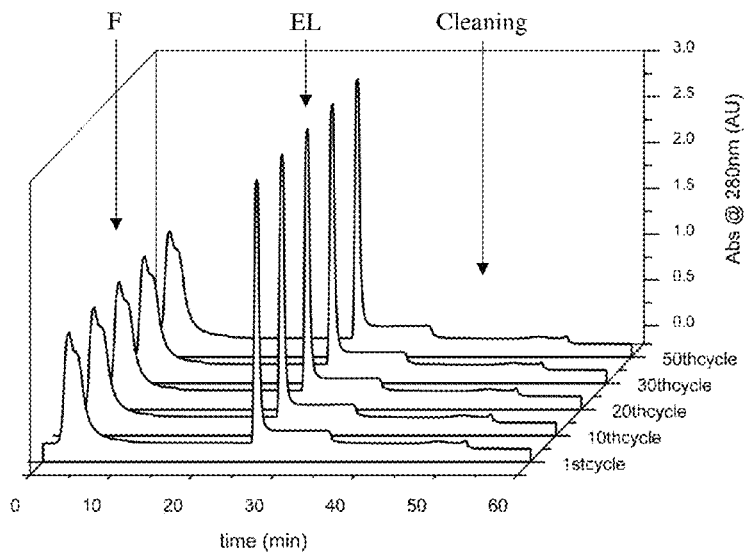
Figure 7B:
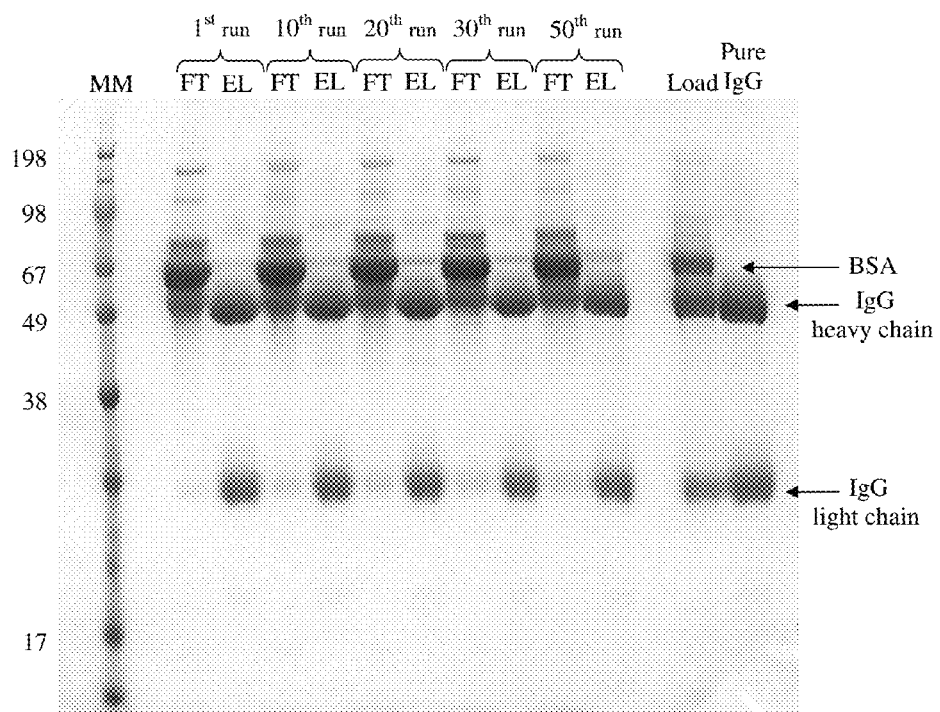

FIG. 7(A). Chromatogram of IgG purification runs using HWRGWV-Toyopearl resin with intermediate aqueous 1 M NaOH cleanings. FIG. 7(B). SDS-PAGE (reducing conditions) of flow-through and eluted fractions of IgG purification from cMEM at $1^{st}$, $10^{th}$, $20^{th}$, $30^{th}$ and $50^{th}$ cycles. Labels: MM—molecular weight marker, FT—flow-through fraction, EL—elution fraction.

5. DETAILED DESCRIPTION OF THE INVENTION

In particular non-limiting embodiments, the present invention provides a method of preparing an alkaline-stable functionalized solid support which comprises: (a) contacting a solid support comprising hydroxyl groups and additional nucleophilic groups under suitable conditions with an alkaline-stable protected (i) biomonomer or (ii) biopolymer so as to form a coupled solid support; (b) reacting the coupled solid support under suitable conditions so as to cleave any alkaline-labile bonds formed between any hydroxyl groups and the alkaline-stable protected (i) biomonomer or (ii) biopolymer; (c) acylating the hydroxyl groups in the coupled solid support to form an acylated coupled solid support; (d) removing the alkaline-stable protecting group from the biomonomer or biopolymer to yield a deprotected biomonomer or biopolymer on the acylated coupled solid support; (e) contacting the acylated coupled solid support with suitable reagents so as to link at least one additional protected biomonomer or biopolymer to the deprotected biomonomer or biopolymer on the acylated coupled solid support; and (f) deacylating the acylated coupled solid support so as to form the alkaline-stable functionalized solid support. In the method above, the additional nucleophilic groups on the solid support may be free amino or thiol groups.

The invention also provides a method of preparing an alkaline-stable functionalized solid support which comprises: (a) contacting a polyhydroxyl solid support with an activating agent so as to form an activated solid support; (b) contacting the activated solid support with a protected (i) biomonomer or (ii) biopolymer under suitable conditions so as to form a coupled solid support; (c) acylating any unreacted hydroxyl groups in the coupled solid support to form an acylated coupled solid support; (d) removing the protecting group from the biomonomer or biopolymer to yield a deprotected biomonomer or biopolymer on the acylated coupled solid support; (e) contacting the acylated coupled solid support with a suitable reagent so as to link at least one additional protected biomonomer or biopolymer to the deprotected biomonomer or biopolymer on the acylated coupled solid support; and (f) deacylating the acylated coupled solid support so as to form the alkaline-stable functionalized solid support.

In any of the methods above, the alkaline-stable functionalized solid support may be stable to alkaline conditions up to about 1.0 M NaOH. Alternatively, the support may be stable to alkaline conditions up to about 0.5 M NaOH, about 0.25 M NaOH, about 0.1 M NaOH, about 0.05 M NaOH, about 0.02 M NaOH, about 0.01 M NaOH, under standard CIP or SIP conditions of time and temperature. The acylating may be performed by an anhydride or an acyl halide. In non-limiting embodiments, the anhydride or the acyl halide may be an acetic anhydride, acetyl chloride, benzoic anhydride, or benzyl chloride.

In any of the methods above, step (e) may be repeated so as add a plurality of protected biomonomers to the acylated coupled solid support and the protected monomers may be protected amino acids, nucleic acids, or saccharides.

For some of the methods, the activating agent may be cyanogen bromide, N-hydroxy succinimide ester, carbonyl diimidazole, organic sulfonyl chlorides, epichlorohydrin, divinylsulfone, cyanuric chloride, or maleimide.

The invention is also directed to an alkaline-stable functionalized solid support for affinity chromatography prepared by any of the methods above.

The invention is also directed to a method of purifying a biological which comprises (a) contacting a solution containing the biological with the alkaline-stable functionalized solid support described above, under suitable conditions such that the functionalized solid support binds the biological; (b) washing the functionalized solid support so as to remove any non-specifically bound species; and (c) eluting the biological from the alkaline-stable functionalized solid support. Typically, but not exclusively, the biological is produced by recombinant technology. The biological may be selected from the group consisting of an antibody, an antigen, a blood factor, a carbohydrate, an enzyme, a growth factor, and an immunoglobulin. The antibody may be an antibody fragment or a monoclonal antibody. Where the antibody is a monoclonal antibody, it may be a chimeric antibody, a human antibody, a humanized antibody, or a mouse antibody. The antigen may be a viral antigen or a bacterial antigen such as a chickenpox antigen, a hepatitis A antigen, a hepatitis B antigen, a hepatitis C antigen, an influenza antigen, a measles antigen, a mumps antigen, a viral pneumonia antigen, a polio antigen, a respiratory syncytial virus (RSV) antigen, a rotavirus antigen, or a rubella antigen. Alternatively the antigen may be a bacterial antigen such as a diphtheria antigen, a meningococcal antigen, a pertussis antigen, a bacterial pneumonia antigen, or a tetanus antigen.

Where the biological is a blood factor, the blood factor may be Factor VIII, Factor IX, Factor X, or von Willebrand Factor. Where the biological is a growth factor, the growth factor may be erythropoietin, granulocyte colony-stimulating factor (G-CSF), granulocyte macrophage colony-stimulating factor (GM-CSF), follicle stimulating hormone, human growth hormone, insulin, an interferon, an interleukin, luteinizing hormone, macrophage colony-stimulating factor (M-CSF), or stem cell factor (SCF). In the case where the biological is an enzyme, the enzyme may be α-glucosidase, β-glucocerebrosidase, deoxyribonuclease, laronidase, superoxide dismutase, or tissue plasminogen activator (TPA).

The invention is also directed to a method of polymer synthesis which comprises: (a) preparing the alkaline stable functionalized solid support by the methods above; (b) contacting the alkaline stable functionalized solid support with a suitable reagent so as to cleave the polymer; and (c) recovering the cleaved polymer. The alkaline-stable functionalized solid support may be used for diagnostics purposes.

5.1. Definitions

The term "acylating" means a reaction adds a carbonyl containing alkyl or aryl functional group to a substrate. Examples of acylating reagents include compounds such as anhydrides and acyl halides. Non-limiting examples include acetic anhydride, acetyl chloride, benzoic anhydride and benzoyl chloride. One of ordinary skill will recognize a wide variety of anhydrides or acid halides may be used, however compounds, such as lactic anhydride or lactic chloride, or any other compound that would introduce free hydroxyl groups are not suitable for the present invention.

The term "alkaline-stable" means materials that do not degrade at high pH under reaction conditions. In the context of solid supports it means materials capable of withstanding repeated cleaning-in-place (CIP) cycles using high pH wash liquid without degradation or loss of binding capacity.

The term "biological" includes biopharmaceuticals or biotherapeutics, such as therapeutic proteins. These may be protein therapeutics with enzymatic and/or regulatory activity; or proteins with special binding activity, such as monoclonal antibodies or Fc-fusion proteins; or protein vaccines; or diagnostic proteins. Biologicals may be isolated from living organisms, such as blood factors, or produced by recombinant technology. See Strohl and Knight, *Curr Opin Biotech*, (2009) 20:668-672, the contents of which are hereby incorporated by reference in its entirety. As used herein, biological also includes viruses and microorganisms such as bacteria, fungi, unicellular or multicellular organisms. In some non-limiting embodiments, a biological may be a pathogenic protein such as a prion, or a pathogenic microorganism such as bacteria, e.g., tuberculosis or anthrax; fungi, e.g., *Candida albicans*; protozoa, e.g., *Plasmodium falciparum*; or a multicellular parasite such as *Schistosoma mansoni*.

A "biopolymer" is a polymer of one or more types of repeating units. Biopolymers can be found in natural biological systems and particularly include oligosaccharides and polysaccharides, peptides (which term is used to include polypeptides and proteins), and polynucleotides (which term is used to include DNA and RNA), or can be produced by artificial biosynthesis, such as peptoids and peptide nucleic acids (PNA). As used herein, the term "biopolymer" includes synthetic compounds having biological activity, such as analogs of naturally occurring compounds composed of or containing amino acids or amino acid analogs, sugars or sugar analogs, or nucleotides or non-nucleotide groups.

The term "biomonomer" means and includes a single unit, which can be linked with the same or other biomonomers to form a biopolymer; for example, an amino acid, a nucleotide, or a saccharide, having one or more linking groups which may have removable protecting groups). Biomonomers may also include compounds such as spacers, for example diamines or dicarboxylic acids, and mixtures thereof, on a hydrocarbon or polyether tether, for example aminoalkanoic acids (see Scheme 5 or Scheme 7).

Biomonomers or biopolymers of the current invention may be protected with one or more "protecting groups" that mask the reactivity of functional groups to prevent unwanted side reactions and that can be cleanly removed at a later synthetic stage. See Isidro-Llobet et al., Amino Acid-Protecting Groups, *Chem Rev* 2009, 109 2455-2504, the contents of which are incorporated by reference in its entirety. Non-limiting examples of protecting groups include:

Alkaline-Stable α-Amino Protecting Groups:

2-(2-Nitrophenyl)propyloxycarbonyl (NPPOC), 2-(3,4-Methylenedioxy-6-nitrophenyl)propyloxycarbonyl (MNP-POC), 2-(4-Biphenyl)isopropoxycarbonyl (Bpoc), 2,2,2-Trichloroethyloxycarbonyl (Troc), 2,4-Dinitrobenzenesulfonyl (dNBS), 2-Chlorobenzyloxycarbonyl (Cl—Z), 2-Nitrophenylsulfenyl (Nps), 4-Methyltrityl (Mtt), 9-(4-Bromophenyl)-9-fluorenyl (BrPhF), Allyloxycarbonyl (Alloc), Azidomethoxycarbonyl (Azoc), Benzyloxycarbonyl (Z), o-Nitrobenzyloxycarbonyl (oNZ) and 6-Nitroveratryloxycarbonyl (NVOC), p-Nitrobenzyloxycarbonyl (pNZ), Propargyloxycarbonyl (Poc), tert-Butyloxycarbonyl (Boc), Trityl (Trt), α,α-Dimethyl-3,5-dimethoxybenzyloxycarbonyl (Ddz), and α-Azido Carboxylic Acids.

Alkaline-Labile α-Amino Protecting Groups:

(1-(4,4-Dimethyl-2,6-dioxocyclohex-1-ylidene)-3-ethyl) (Dde), (1,1-Dioxobenzo[b]thiophene-2-yl)methyloxycarbonyl (Bsmoc), (1,1-Dioxonaphtho[1,2-b]thiophene-2-yl)methyloxycarbonyl (r-Nsmoc), 1-(4,4-Dimethyl-2,6-dioxocyclohex-1-ylidene)-3-methylbutyl (ivDde), 2-(4-Nitrophenylsulfonyl)ethoxycarbonyl (Nsc), 2-(4-Sulfophenylsulfonyl)ethoxycarbonyl (Sps), 2,7-Di-tert-butyl-Fmoc (Fmoc*), 2-[Phenyl(methyl)sulfonio] ethyloxycarbonyl tetrafluoroborate (Pms), 2-Fluoro-Fmoc (Fmoc(2F)), 2-Monoisooctyl-Fmoc (mio-Fmoc) and 2,7-Diisooctyl-Fmoc (dio-Fmoc), 9-Fluorenylmethoxycarbonyl (Fmoc), Ethanesulfonylethoxycarbonyl (Esc), and Tetrachlorophthaloyl (TCP).

Alkaline-Stable α-Carboxylic Acid Protecting Groups:

(2-Phenyl-2-trimethylsiylyl)ethyl (PTMSE), 1,1-Dimethylallyl (Dma), 2-(Trimethylsilyl)isopropyl (Tmsi), 2,2,2-Trichloroethyl (Tce), 2,4-Dimethoxybenzyl (Dmb), 2-Chlorotrityl (2-Cl-Trt), 2-Phenylisopropyl (2-PhiPr), 2-Phenylisopropyl (2-PhiPr), 2-Trimethylsilylethyl (TMSE), 4-(3,6,9-Trioxadecyl)oxybenzyl (TEGBz or TEGBn), 4,5-Dimethoxy-2-nitrobenzyl (Dmnb), 5-Phenyl-3,4-ethylenedioxythenyl Derivatives (Phenyl-EDOTn), Allyl (Al), Benzyl (Bn), Cyclohexyl (cHx), Pentaamine Cobalt(III), Phenacyl (Pac), p-Hydroxyphenacyl (pHP), p-Nitrobenzyl (pNB), tert-Butyl (tBu), β-3-Methylpent-3-yl (Mpe), and β-Menthyl (Men).

Alkaline-Labile α-Carboxylic Acid Protecting Groups:

9-Fluorenylmethyl (Fm), Methyl (Me) and Ethyl (Et), Carbamoylmethyl (Cam), and 4-(N-[1-(4,4-dimethyl-2,6-dioxocyclohexylidene)-3-methylbutyl]amino)benzyl (Dmab), Thiol Protecting Groups:

2,2,4,6,7-Pentamethyl-5-dihydrobenzofuranylmethyl (Pmbf), 2-Pyridinesulfenyl (S-Pyr), 3-Nitro-2-pyridinesulfenyl (Npys), 4-Picolyl, 9-Xanthenyl (Xan), Acetamidomethyl (Acm), Allyloxycarbonyl (Alloc), Benzyl (Bn), Monomethoxytrityl (Mmt), N-Allyloxycarbonyl-N-[2,3,5,6-tetrafluoro-4-(phenylthio), o-Nitrobenzyl (oNB), phenyl] aminomethyl (Fsam), Phenylacetamidomethyl (PhAcm), p-Methoxybenzyl (Mob), p-Methylbenzyl (Meb), tert-Butyl (tBu) and 1-Adamantyl (1-Ada), tert-Butylmercapto (StBu), Trimethoxybenzyl (Tmob), and Trityl (Trt).

The term "solid support" means materials with a hydrophilic coating may be used in the present invention. Solid supports include inorganic materials, organic materials, and combinations thereof. It may be a hydroxylated solid support or a hydroxylated composite solid support. The solid support may be an acrylamide derivative, agarose, cellulose, chitin, chitosan, dextran, glass, magnetite, polyacrylate, polyacrylamide, polystyrene, polyvinyl alcohol, silica, silicon, zirconia, and combinations thereof. The solid support material may be in the form of porous beads, which may be spherical. Alternatively, the support may be particulate or divided form having other regular or irregular shapes. Other examples of suitable solid support materials include membranes, semipermeable membranes, capillaries, microarrays, monoliths, multiple-well plates comprised of alumina, alumina supported polymers, or polysaccharides. Solid supports of the present invention may be rigid or non-rigid flexible materials such as a fabric which may be woven or non-woven.

Preferred solid support materials are those having minimal non-specific binding properties and that are physically and chemically resistant to the conditions used for organic synthesis as well as for the purification process employed in this invention such as changes in pH and ionic strength. The solid support used in the present invention may be a polymer of acrylate. Examples of acrylate polymers include, but are not limited to, polymethacrylate, polyhydroxy methacrylate, polymethyl methacrylate, polyacrylamide, polyacrylonitrile and other acrylate derivatives. In a preferred non-limiting embodiment, the solid support is a methacrylate polymer.

5.2. Methods

In one embodiment, the method for the preparation of peptide-based affinity adsorbents consists in building the peptide directly on polymethacrylate-based Toyopearl AF-Amino-650M resin via conventional fluorenylmethyloxycarbonyl (Fmoc)-based coupling chemistry. G. B. Fields, R. L. Noble, *Int. J. Pept. Prot. Res.* 35 (1990) 161.

The evaluation of the properties of the functional groups present on the chromatographic resin and of the conditions applied for amino acid coupling allowed to ascertain the causes of the massive ligand loss. It was determined that the peptide synthesis directly performed on hydrophilic amino resins yields two populations of peptides, one coupled onto amino groups and the other onto hydroxyl groups, respectively by amide and ester bonds. M. Amblard, J. A. Fehrentz, J. Martinez, G. Subra, *Mol. Biotechnol.* 33 (2006) 239. While the former are highly chemically stable, the latter are labile in alkaline conditions and are responsible for the ligand loss during the NaOH wash. To the best of our knowledge, the alkaline lability of affinity adsorbents produced by direct peptide synthesis on chromatographic media has not yet been described in the literature.

In non-limiting embodiments, this invention is also directed to a method of resin surface modification for synthesizing alkaline stable peptide adsorbents. The method consists of the following steps: (i) activating the base matrix, (ii) selectively blocking the hydroxyl groups and (iii) performing the peptide synthesis exclusively on amino groups through alkaline-stable amide bonds.

The affinity adsorbent HWRGWV-Toyopearl resin prepared by direct peptide synthesis on commercial chromatographic amino resin was studied for the purification of IgG from cell culture medium. First, a CIP step performed with 0.1 M NaOH on a HWRGWV (SEQ ID NO: 1) adsorbent produced by direct on-resin synthesis caused a massive ligand leaching resulting in a loss of IgG binding capacity. A preliminary study demonstrated the validity of the modification protocol. Specifically, chromophore amino acid (tryptophan) was coupled on a batch of modified resin, which showed a negligible amino acid leakage when washed in alkaline conditions. Finally, the ligand HWRGWV (SEQ ID NO: 1) was synthesized on the modified resin to produce an alkaline-stable affinity absorbent. Consecutive cycles of IgG purification were performed, each followed by an alkaline CIP step. An aqueous 0.1M NaOH solution was used for 200 cycles, while a 0.5M NaOH and a 1M NaOH solutions were employed for 100 and 50 cycles respectively, without observing any significant loss in purification performance.

5.3. Solid Phase Peptide Synthesis (Spps)

Peptides are often synthesized by solid phase peptide synthesis (SPPS). The method consists of the sequential attachment of protected amino acids on a solid phase, usually a resin, to obtain a peptide chain typically in the C to N direction. Alternatively, the chain may be constructed in the N to C direction. The amino acids are protected on the α-amino group and, when needed, on the side functional group. Peptides of the present invention may be synthesized using any well-known technique in the art, including solid phase synthesis. See Scheme 1, steps a-e below. The first step involves the activation of the carboxyl terminus of the amino acid by using a coupling agent, such as a carbodiimide (diisopropylcarbodiimide (DIC), 1-ethyl-3-(3-dimethylaminopropyl)carbodiimide (EDC)) joined by racemization suppressant (hydroxybenzotriazole (HOBt) and hydroxyazobenzotriazole (HOAt)), or phosphonium (benzotriazol-1-yl-oxytripyrrolidinophosphonium hexafluorophosphate (PyBOP)) or aminium/uronium salts (2-(6-Chloro-1H-benzotriazole-1-yl)-1,1,3,3-tetramethylaminium hexafluorophosphate (HCTU), 2-(7-Aza-1H-benzotriazole-1-yl)-1,1,3,3-tetramethyluronium hexafluorophosphate (HATU) or others such as those described in Isodro-Llobet 2009. The activated amino acid thus couples to the free amino groups on the resin (a). The α-amino group of the coupled amino acid is then deprotected (b) in order for a second amino acid to be coupled (c). The synthesis thus proceeds through a sequence of coupling and deprotection steps (d-e).

Scheme 1-Fmoc based solid phase peptide synthesis.

a.

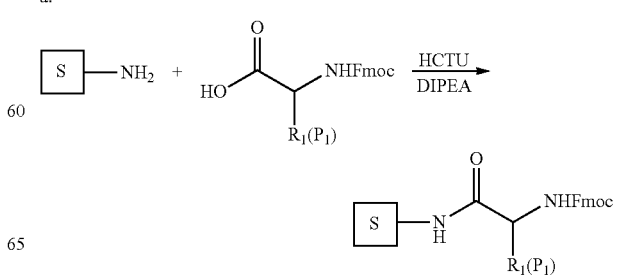

-continued b.

[Chemical scheme showing Fmoc deprotection with 20% Pip]

c.

[Chemical scheme showing coupling of second amino acid with HCTU/DIPEA]

d. (repeated n times)

[Chemical scheme showing coupling of following amino acids with HCTU + DIPEA]

[Chemical scheme showing final Fmoc deprotection and cleavage with 20% Pip / TFA]

Step a. coupling of the first amino acid; step b. Fmoc deprotection of the first amino acid; step c. coupling of the second amino acid; step d. coupling of following amino acids; step e. final Fmoc deprotection and cleavage of side protecting groups. S: solid phase; $R_i$: amino acid functional group; $P_i$: amino acid protecting group.

Useful protecting groups for the α-amino group of the amino acid are 9-fluorenyl-methoxy-carbonyl (Fmoc) and tert-butoxycarbonyl (Boc), which are shown in Scheme 2 below. The former is base labile and is removed via piperidine washes, while the latter is acid labile and is removed via trifluoroacetic acid (TFA) washes. The Fmoc based peptide synthesis is the preferred method for the ease of deprotection.

Scheme 2.

a.

[Structure of Fmoc protecting group: R—NH—C(=O)—O—CH2-fluorenyl]

b.

[Structure of Boc protecting group: R—NH—C(=O)—O—C(CH3)3]

Structure of two common α-amino protecting groups: a. Fmoc, b. Boc

Traditionally, SPPS is carried out on polystyrene, polyacrylamide or polyethylene glycol based resins, due to their high swelling and chemical stability to reagents and solvents used in synthesis. However, due to their poor mechanical properties and non-specific interactions, these resins are not optimal as commercial chromatographic media. The peptide HWRGWV (SEQ ID NO: 1) was therefore synthesised onto polymethacrylate-based Toyopearl AF-Amino-650M resin using Fmoc chemistry. This support fulfils both requirements for chromatographic applications, namely mechanical and chemical stability, highly hydrophilicity and low non-specific binding, as well as for peptide synthesis, such as resistance to organic solvents and reagents used for SPPS. The Toyopearl base matrix is known to be stable in NaOH solution. Tosoh Biosciences, Toyopearl® AF-Amino-650M product overview, PO13 0707.

5.4. Solid Support Design Considerations

The binding capacity of the absorbent is determined by several parameters, such as ligand density, spacer arm, support material and surface chemistry. Ligand density has significant influence on the interactions between ligand and target protein. If the binding is attributed to monovalent interactions, the capacity increases with the increase in ligand density, while the association constant (strength of binding) may remain unaltered at lower ligand density and decrease at high ligand density due to steric effects. In fact when the ligand density exceeds a limit level, most of the ligands remain buried beneath the bound molecules without playing any role in binding. Therefore, there is an optimal density at which the ligands are efficiently acting as binders and the absorbent shows the highest binding capacity. Small protein molecules, such as S-protein, have monovalent interactions with peptides and typically show the phenomenon explained above. Huang P. Y. and Carbonell R. G. (1999) Affinity chromatographic screening of soluble combinatorial peptide libraries, *Biotechnol. Bioeng.* 63, 633-641. On the other hand, if the binding is attributed to multivalent attractions, increasing the ligand density typically increases the capacity and the association constant. This was observed in the adsorption of a large protein molecule, von Willebrand factor (vWF), to peptide ligands on a resin surface. Wang G. and Carbonell R. G. (2005) Characterization of a peptide affinity support that binds selectively to staphylococcal enterotoxin B. *J. Chromatogr A.* 1078, 98-112.

Also the ligand accessibility is known to considerably affect the binding capacity of resins. Hahn R., Berger E., Pflegerl K. and Jungbauer A. (2003) Directed immobilization of peptide ligands to accessible pore sites by conjugation with a placeholder molecule. *Anal Chem.* 75, 543-548. The flexibility of natural chromatography supports such as agarose and dextran may conceal the peptide in the interior of polysaccharide fibers. Amatschek K., Necina R., Hahn R., Schallaun E., Schwinn H., Josic D., Jungbauer A. (2000) Affinity Chromatography of Human Blood Coagulation Factor VIII on Monoliths with Peptides from a Combinatorial Library. *J. High Resolut. Chromatogr.* 23, 47-58.

The use of a spacer arm may enhance the accessibility of the ligand, therefore improving its interaction with the target's binding site. In case of high ligand density, the above mentioned effect of steric hindrance exerted by target molecules on superficial binders can be reduced by the use of a spacer arm. This will enhance the ligand utilization even at high density, thus allowing the achievement of superior levels of binding capacity.

5.5. Resin Functionalization (Amino Groups)

Commercially available activated matrixes have a low functional density, being primarily meant for protein immobilization. See also, *Immobilized Affinity Ligand Techniques*, Greg T. Hermanson, A Krishna Mallia, Paul K. Smith Academic Press New York 1992, the contents of which are hereby incorporated by reference in its entirety. For example, Sepharose® epoxy 6B (epoxide density=0.07-0.14 meq/g), POROS® EP 20 μm (0.02-0.03 meq/g), Profinity Epoxide (0.05-0.13 meq/g). For some commercial applications the functional density of these supports is insufficient to provide small ligand-based absorbents with appreciable binding capacity. As discussed before, in order to achieve high binding capacity, relatively high ligand density is necessary.

Therefore, the first step involves the activation of a hydrophilic base resin, such as Toyopearl HW 65 or Sepharose 6B, in order to obtain high density of reactive groups. Preliminary studies indicate that, among the known chemistries for resin activation, the protocols based on carbonyl diimidazole, epichlorohydrin, and tosyl chloride, gave the highest functional density. The activated groups formed with these chemistries are ultimately converted to amino groups by reacting with ammonium hydroxide. Scheme 3 below shows the reactions to activate the hydrophilic base resin.

Scheme 3: Chemistries for activation of hydroxyl base resin.

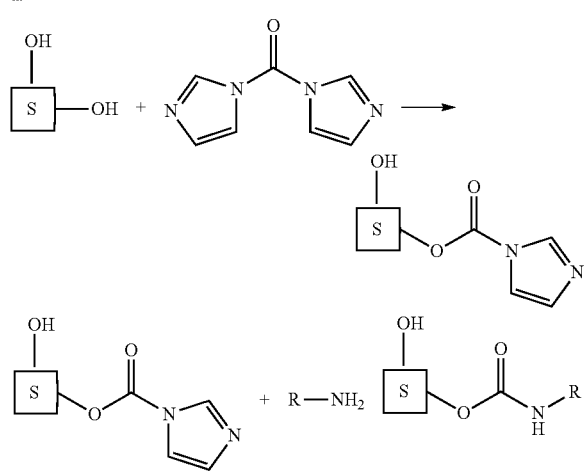

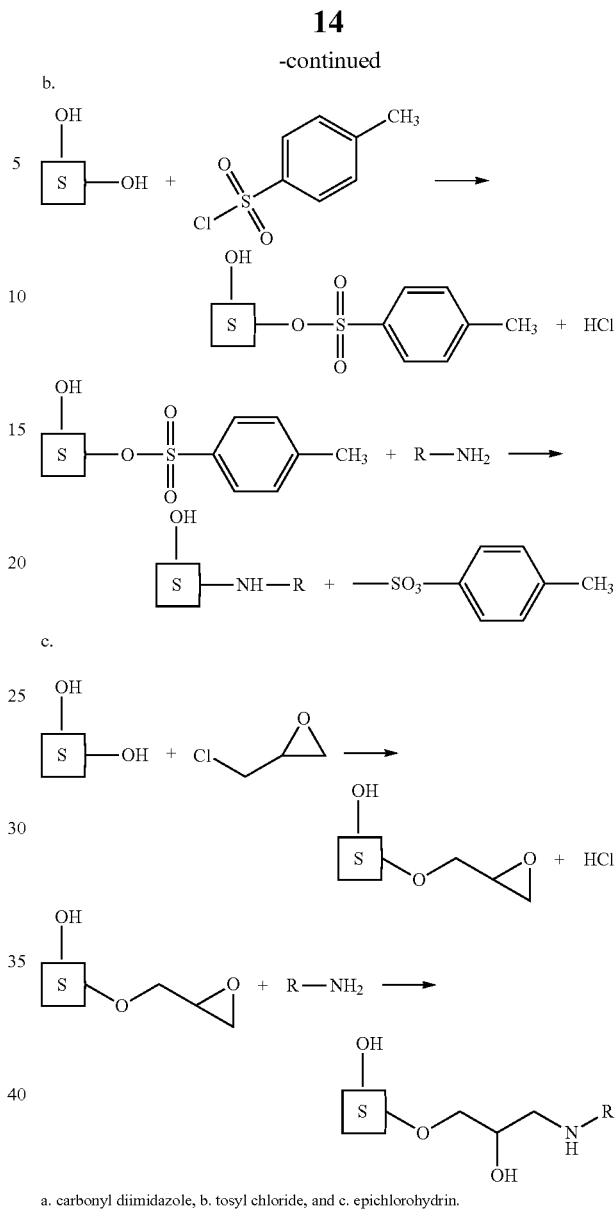

a. carbonyl diimidazole, b. tosyl chloride, and c. epichlorohydrin.

5.6. Second Stage: Surface Chemistry

As it results from functionalization, along with the amino groups, the resin bears a number of hydroxyls. The peptide synthesis on such resin would lead to two populations of peptides, one bound onto amino groups via alkaline-stable amide bonds and the other onto hydroxyl groups via alkaline-labile ester bonds. Therefore, the second stage consists in the selective capping of hydroxyl groups, performed via a sequence of steps shown in Scheme 4 below. First Boc-Glycine is coupled to the resin (Scheme 4, Step 1). Then a NaOH wash is carried out to remove the Boc-Glycine coupled through ester bonds (Step 2). Due to its stability in alkaline conditions, the Boc protection is not removed from the Glycine molecules coupled through amide bond. Then, acetylation is carried out to block all the free hydroxyl groups (Step 3). It is worthy to notice that while this acetylation is performed, Boc group is still protecting the amino groups, thus preventing their acetylation that would make them unavailable for peptide coupling. Finally, the Boc is removed via TFA washing, thus leading to a resin bearing only amino groups (Step 4).

Scheme 4 - surface chemistry modification.

Step 1.

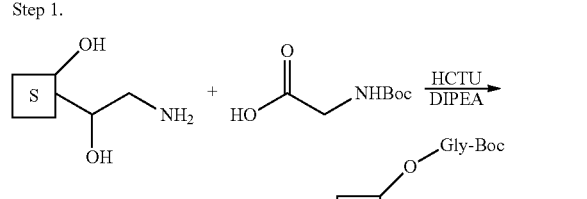

Step 2.

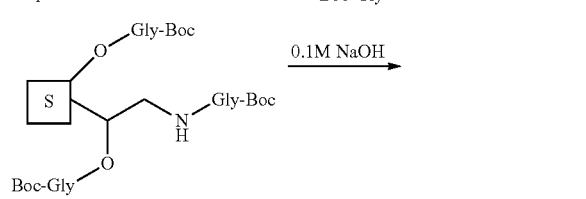

Step 3.

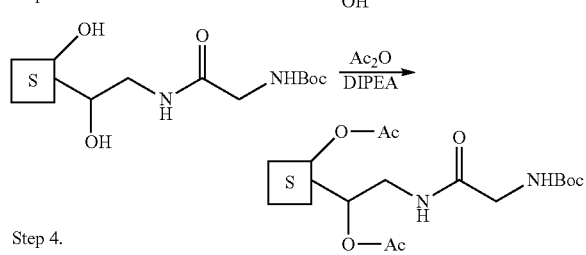

Step 4.

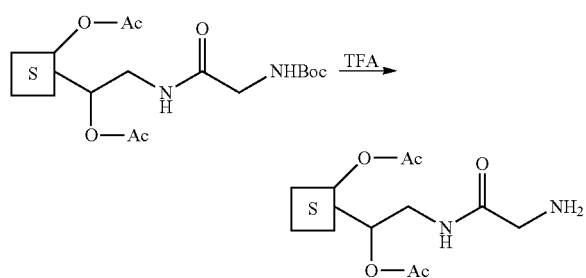

5.7. Third Stage: On Resin Peptide Synthesis/Attachment of a Pre-synthesised Peptide A spacer arm is then attached to the resin. Available alternatives are ω-amino carboxylic acids or aminoalkanoic acids, such as aminocaproic acid, or carboxyl-(ethyleneglycol)$_n$-ethylamine (Carboxy-PEG$_n$-Amine), shown in Scheme 5 below. The peptide ligand is then synthesized on the resin via Fmoc-based coupling chemistry and finally the side protective groups are removed with TFA.

Scheme 5-aminocaproic acid and Carboxy-PEG$_n$-Amine

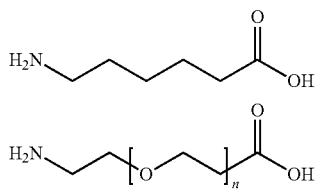

The strategy proposed above involves the extensive use of organic solvents and reagents, such as N,N-dimethylformamide (DMF), dichloromethane (DCM), piperidine and TFA. Many of the commercially available chromatographic supports, in particular gel-based matrixes, such as Sepharose®, are not stable to such organic reagents. Therefore, in order to make the peptide-based affinity technology applicable to the widest range of chromatographic media, an alternative method is described below, in which a pre-synthesized peptide is attached to the matrix using chemistries that can be performed in aqueous environment. The peptide may be synthesized on conventional SPPS resin, fully deprotected, cleaved and finally purified. The resulting molecule, whose general structure is presented in Scheme 6-a. (below), is coupled through its amino terminal on the desired support. In order to achieve high ligand density, the support is pre-activated with one of the functionalization methods mentioned above (First Stage: Resin functionalization). Also it is noted that a spacer arm can be included in the structure of the molecule. As shown in Scheme 6-b, the coupling will not lead to formation of ester bonds, as the peptide is coupled exclusively via amide bonds, thus resulting in an alkaline stable absorbent.

Scheme 6 a.

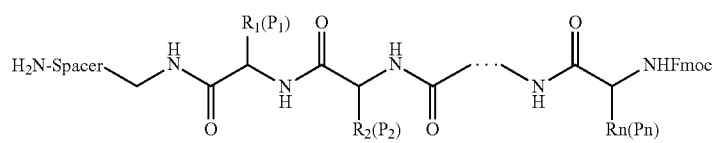

b.

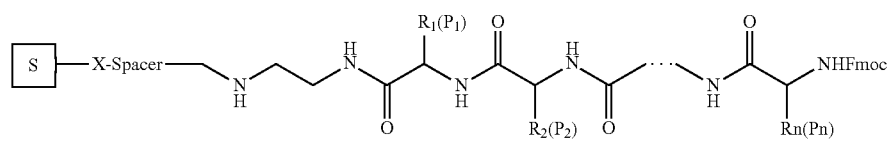

a) the peptide molecule, b) peptide-based absorbent; X is a carbamate bond in case of CDI activation, it is —CH$_2$— in case of tosyl activation, and —CH(OH)—CH$_2$—NH— in case of epoxide activation.

This method allows the use of a wider range of supports for the peptide immobilization and results in alkaline-stable absorbents. However, it involves additional costs and longer procedures related to the synthesis and purification of the ligand prior to its immobilization.

5.8. Resin Modification 5.8.1. Resin Activation and Surface Chemistry Modification Toyopearl HW 65 resin is functionalized using CDI, tosyl chloride and epichlorohydrin based chemistries. The activated resin is reacted with ammonium hydroxide to convert the functional groups into primary amines. Different concentrations of ammonium hydroxide are employed in order to obtain batches of resins with different amino density. Then the surface chemistry of the resins is modified by means of the following sequence of steps: 1) coupling of Boc-glycine via HCTU chemistry, 2) NaOH wash to remove the glycine coupled through ester bonds, 3) acetylation of hydroxyl groups, 4) Boc removal with 50% TFA in DCM.

5.8.2. Coupling of Spacer Arm and Peptide Synthesis

The following spacer arms are adopted: N-Fmoc-4-aminobutyric acid, N-Fmoc-6-aminohexanoic acid (Fmoc aminocaproic acid) and N-Fmoc-8-amino-3,6-dioxa-octanoic acid (Scheme 7 below).

Scheme 7-Fmoc protected spacer arms.

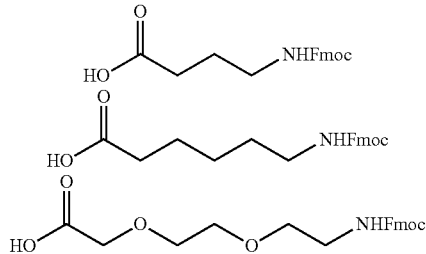

These spacers are coupled to the amino resins via HCTU chemistry. Several couplings are performed to saturate all the available amino groups, as monitored with Kaiser test. Finally the Fmoc protection is removed in 20% piperidine in DMF. Fmoc deprotection also allows one to quantify the density of the spacer arms on the resin. The peptide HWRGWV (SEQ ID NO: 1) is then be synthesised on the amino group of the spacer arm via conventional Fmoc chemistry, according to the sequential coupling of Fmoc-Val-OH, Fmoc-Trp(Boc)-OH, Fmoc-Gly-OH, Fmoc-Arg(PbO—OH, Fmoc-Trp(Boc)-OH, and finally Fmoc-His(Trt)-OH. Finally, the terminal Fmoc protection is removed with 20% piperidine in DMF and the side protective groups are cleaved with a cocktail of TFA and scavengers. Similarly the peptides HYFKFD and HFRRHL (SEQ ID NO: 2-3) are synthesised.

2—Immobilization of Pre-synthesised Peptide

Polystyrene-based Solid Phase Peptide Synthesis

The peptide HWRGWV (SEQ ID NO: 1) is synthesised via HCTU coupling chemistry onto diaminoethyl-2-chlorotrityl polystyrene-based resin or aminoethylthio-2-chlorotrityl polystyrene-based resin (Scheme 8-a.). Also, in order to have a PEG based spacer arm, the peptide synthesis is carried out on the resin shown in Scheme 8-b.

Scheme 8 - chlorotrityl polystyrene based resin, with a. ethyl and b. PEG spacers. X = NH for diamino spacer, X = S for aminothiol spacer.

a.

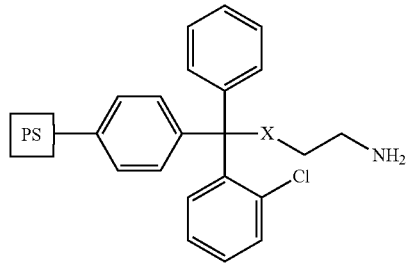

b.

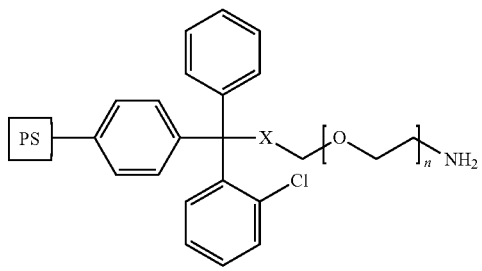

The peptide synthesis of HWRGWV (SEQ ID NO: 1) will result in the molecules shown in Scheme 9 below. Note that the same procedure also applies to the peptides HYFKFD and HFRRHL (SEQ ID NO: 2-3).

Scheme 9 - full protected form of HWRGWV (SEQ ID NO: 1) on polystyrene based chlorotrityl resin, with a. ethyl and b. PEG spacers. X = NH for diamino spacer, X = S for aminothiol spacer.

a.

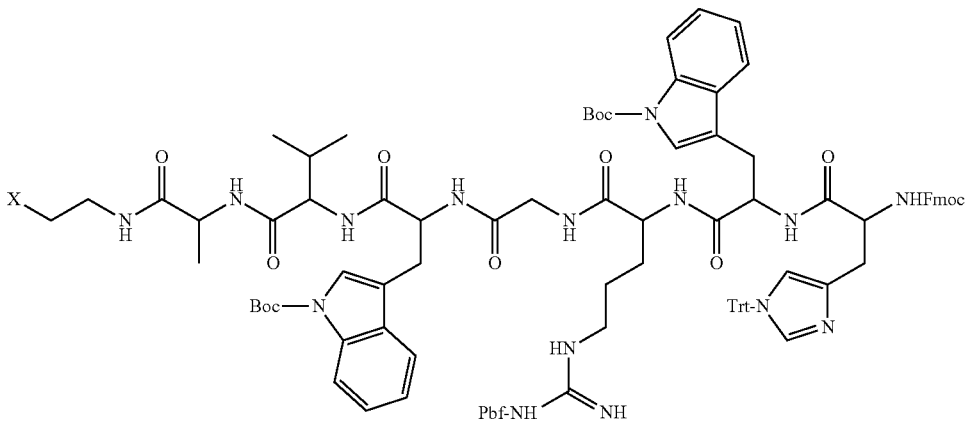

b.

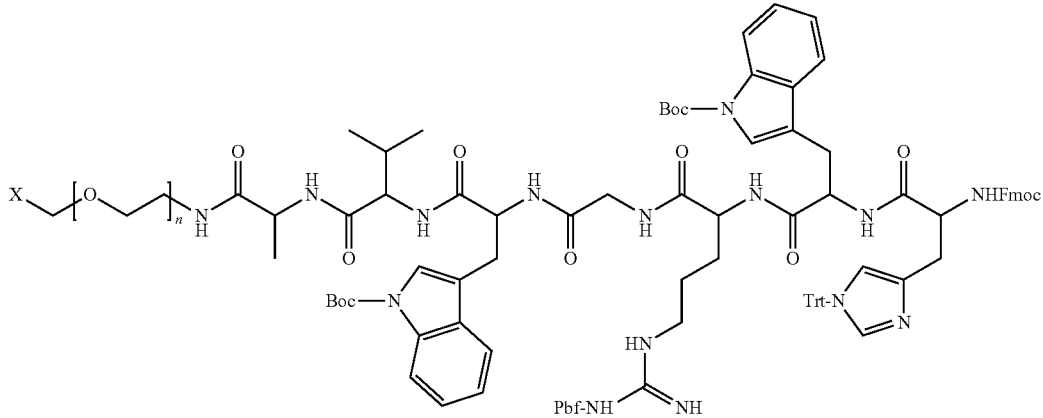

After the synthesis is complete, an appropriate cocktail of TFA and scavengers (94/3/2/1 TFA/TIPS/Water/EDT and a pinch of Indole) is used to cleave the molecule from the resin and simultaneously remove the side protecting groups from the amino acids. After cleavage the peptides is purified via RP-HPLC, using a gradient of acetonitrile in water. Finally, the purified peptide is lyophilised.

Peptide Immobilization

Sepharose 6B resin can be functionalized using CDI, tosyl chloride and epichlorohydrin based chemistries. The peptide is dissolved in a mixture of aqueous buffer (pH 9-11) and a compatible organic solvent, such as DMF, DMSO or dioxane. This peptide solution will be added to the activated Sepharose 6B. The reaction is carried out at a temperature between 30° C.-45° C. and for 24 to 48 hours.

3—Testing of the Peptide Resins

The methods explained above generate a large number of peptide-based resins, diversified by the peptide sequence (HWRGWV, HYFKFD and HFRRHL) (SEQ ID NO: 1-3) and density (0.2-0.6 meq/g), nature of the solid support (Toyopearl or Sepharose) and nature and length of spacer arm. Each one of these resins is packed in a column and tested for IgG dynamic binding capacity and stability towards 0.1M-1M NaOH. The performance of each resin is to be represented in terms of parameters of industrial interest, such as product yield and purity from different complex sources and column lifetime when subjected to repeated cycles of purification and sanitization.

5.9. Peptide And Other Biopolymer Synthesis

Means for synthesizing peptide libraries on a solid phase support are well known in the art. See U.S. Pat. Nos. 5,834, 318 (Buettner et al.); 6,207,807 (Fassina et al.); 6,670,142 (Lau & Lam); 6,599,875 (Serlupi-Crescenzi et al.); 7,408,030 (Carbonell et al.); R. Merrifield, J. Am. Chem. Soc. 85:2149-2154 (1963); G. Baray and R. Merrifield, Solid phase peptide synthesis, In The Peptides, E. Gross and J. Meinhofer, eds., Academic Press, New York, 1-284p (1980); G. Fields, Solid-Phase Peptide Synthesis, Academic Press, San Diego (1997), all of which are incorporated herein by reference.

Other chemistries for generating chemical diversity libraries can also be used. Such chemistries include, but are not limited to: U.S. Pat. Nos. 6,184,364 (Pieken et al., aptamers with modified nucleotides); 6,075,121 (Bartlett et al., peptoids); 6,060,596 (Lerner et al., encoded peptides); 5,858,670 (Lam et al., random bio-oligomers); 5,539,083 (Cook et al., peptide nucleic acid libraries); 5,593,853 (Chen and Radmer, carbohydrate libraries); 5,475,096 (Gold and Tuerk, aptamers); aptamers, Levy-Nissenbaum et al., 2008, Trends in Biot. 26(8) 442-449; carbohydrate libraries, Liang et al., 1996, Science, 274:1520-1522; diversomers such as hydantoins, benzodiazepines and dipeptides, Hobbs et al., 1993, Proc. Nat. Acad. Sci. USA, 90, 6909-6913; nonpeptidal peptidomimetics with glucose scaffolding, Hirschmann et al., 1992, J. Amer. Chem. Soc., 114, 9217-9218; oligocarbamates, Cho et al., 1993, Science, 261, 1303; peptidyl phosphonates, Campbell et al., 1994, J. Org. Chem., 59:658); vinylogous polypeptides, Hagihara et al., 1992, J. Amer. Chem. Soc., 114, 6568; all of which are incorporated herein by reference.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present invention may suitably "comprise", "consist of", or "consist essentially of", the steps, elements, and/or reagents described in the claims.

The following Examples further illustrate the invention and are not intended to limit the scope of the invention.

6. EXAMPLES 6.1. Materials

HWRGWV (SEQ ID NO: 1) resin having a peptide density of 0.15 meq/g was purchased from Creosalus (Louisville, Ky., USA). The peptide was synthesized directly on Toyopearl AF-Amino-650M resin (particle size 65 μm) by conventional Fmoc coupling chemistry. The resins Toyopearl AF-Amino-650M and Toyopearl HW-65F were purchased from Tosoh Bioscience (King of Prussia, Pa., USA). Toyopearl HW-65F is a base resin having hydroxyl groups and is derivatized to produce Toyopearl AF-Amino 650M which has amine functional groups, while also having hydroxyl groups available. The reagents for peptide synthesis, Fmoc-protected amino acids (Fmoc-Ala-OH, Fmoc-Arg(Pbe-OH, Fmoc-Gly-OH, Fmoc-His(Trt)-OH, Fmoc-Phe-OH, Fmoc-Trp (Boc)-OH, Fmoc-Trp-OH, Fmoc-Val-OH) and the coupling agents (2-(1H-7-azabenzotriazol-1-yl)-1,1,3,3-tetramethyl uronium hexafluorophosphate methanaminium (HATU) and 2-(6-chloro-1H-benzotriazole-1-yl)-1,1,3,3-tetramethylaminium hexafluorophosphate (HCTU)) were purchased from ChemPep Inc. (Wellington, Fla., USA). Boc-Gly-OH, Boc-diaminoethane and carbonyl diimidazole were from Fisher Scientific (Pittsburgh, Pa., USA). Diisopropylethylamine, ethanedithiol, thioanisole, anisole, piperidine (99%), trifluoroacetic acid and acetic anhydride were from Sigma Aldrich (Saint Louis, Mo., USA). The solvents employed for peptide synthesis and analysis, dimethylformamide (extra dry), dichloromethane (extra dry), acetonitrile (HPLC grade) and trifluoroacetic acid (HPLC grade) were from Fisher Scientific (PA, USA). Human polyclonal immunoglobulin G (IgG) in lyophilized form was purchased from Equitech-Bio, Inc. (Kernville, Tex., USA). Sodium chloride, sodium hydroxide, sodium acetate, hydrochloric acid and glacial acetic acid were obtained from Fisher Scientific (Pittsburgh, Pa., USA). Phosphate buffer saline (PBS) of pH 7.4, ethanol, methanol and isopropanol were from Sigma Aldrich (Saint Louis, Mo., USA). All the solvents were of analytical grade. Cell culture medium (Eagle Minimum Essential medium, EMEM) was from Quality Biological (Gaithersburg, Md., USA). Fetal calf serum (FCS) and tryptose phosphate broth (TPB) were obtained from Hyclone (Logan, Utah, USA) and Becton Dickinson (Sparks, Md., USA), respectively. The complete mammalian cell culture medium (cMEM) was prepared by combining EMEM with 10% FCS and 5% TBP. NuPAGE® Novex gels (4-12% Bis-Tris), NuPAGE® MOPS and MES running buffers, NuPAGE® LDS sample buffer, NuPAGE® reducing agent, SeeBlue plus2® pre-stained molecular weight marker, SimpleBlue™ SafeStain were all from Invitrogen (Carlsbad, Calif., USA). A HiTrap™ Protein G column was purchased from GE Healthcare (NJ, USA). A Waters 626 LC system integrated with 2487 UV detectors (Waters, Mass., USA) was used for all chromatography runs. Microbore stainless steel columns 30 mm long×2.1 mm I.D. were from Altech-Applied Science (Somerset, Pa., USA). All experiments were carried out at room temperature.

6.2. Methods 6.2.1. On-column Alkaline CIP of HWRGWV-Toyopearl Resin Prepared Via Direct On-resin Synthesis Thirty five milligrams of HWRGWV-Toyopearl resin was dry-packed in 30 mm×2.1 mm I.D. Microbore columns (0.1 mL). The resin was swollen with 20% v/v methanol and then washed with PBS, pH 7.4. Equilibration was performed by PBS buffer containing 1 M NaCl. A 100 µL feed solution of IgG, prepared by spiking 10 mg of IgG into 1 mL of complete cell culture medium (cMEM), was loaded onto the column at a flow rate of 0.05 mL/min (87 cm/h). The column was washed with 4 mL of equilibration buffer at flow rate of 0.2 mL/min (346 cm/h). Elution was then performed with 4 mL of 0.2 M acetate buffer pH 4 at a flow rate of 0.4 mL/min (692 cm/h). The column was then regenerated with 0.1 M sodium hydroxide at the flow rate of 0.1 mL/min (174 cm/h) for 10 min. The effluent was monitored by UV absorbance at 280 nm. Different cycles of IgG purification followed by alkaline regeneration were performed. Fractions were collected and concentrated five times by centrifugation at 4° C., 20817×g for 30 min using an Amicon Ultra centrifugal filter (3000 MWCO, Ultracel®, Millipore, MA, USA). These fractions were then used for analysis of IgG purity and yield (see section 6.2.7).

6.2.2. Study of Stability Per Se of the Ligand

A 100 µg/mL solution of pure HWRGWV (SEQ ID NO: 1) peptide was prepared in 20:80 water:acetonitrile. The solution was divided into three samples, in which the NaOH concentration was brought respectively to 0.1 M, 0.5 M and 1 M by adding aqueous 10 M NaOH solution. Aliquots were withdrawn from each sample after 10, 20, 30, 45, 60 and 120 min and neutralized with an appropriate volume of aqueous 12 N HCl. The resulting fifteen samples were concentrated and desalted using C18 ZipTips® (Millipore, Bedford, USA).

The initial ligand solution and the samples were analyzed by C18 HPLC (RAININ Microsorb-MV HPLC Column VARIAN 86-200-E3, 3 µm particle diameter), running a linear gradient of water:acetonitrile from 95:5 to 60:40 in 30 min. The absorbance was monitored at 220 nm and 280 nm. The samples were also analyzed by MALDI-TOF MS (Shimadzu Biotech Axima Assurance MALDI). A 0.75 µL of each sample was mixed with 20 µL of Universal MALDI Matrix (Fluka Analytical) and loaded onto the MALDI plate.

6.2.3. Determination of the Amount of Amide Vs. Ester Bonds

The amount of amide bonds and ester bonds formed during solid phase peptide synthesis was determined by coupling tryptophan to Toyopearl AF-Amino-650 M and Toyopearl HW-65 F resins and estimating the amino acid density on each of the resins. One hundred milligrams of each of the resins were swollen in 20% v/v methanol in water for 2 h and washed with anhydrous DMF. An anhydrous DMF solution (1 mL) of Fmoc-Trp-OH (51.2 mg, 3 eq. to resin), HCTU (49.6 mg, 3 eq.) and diisopropylethylamine (DIPEA) (41.8 pt, 6 eq.) was added to the resins. The mixture was shaken for 3 h and the resin was washed with DMF. Further couplings were repeated to saturate all the available amino groups, as monitored by Kaiser test. Finally, the Fmoc protection was removed by incubating the resins with 2 mL of 20% v/v piperidine in DMF solution for 30 min. The Fmoc released in the supernatant was analyzed spectrophotometrically at 301 nm and used for estimation of the amino acid density of the resins. The difference in amino acid density of the two resins was regarded as a measure of the amount of amino acid coupled through amide bonds. Another method for estimating the amount of amide and ester bonds was to determine the amount of tryptophan leached from the resins on exposure to NaOH solution. This was performed as follows: thirty five milligrams of each resin batch were dry-packed in a 30 mm×2.1 mm I.D. Microbore column (0.1 mL). The resin was swollen with 20% v/v methanol and then washed with PBS, pH 7.4. Aqueous 0.1 M NaOH was passed at the flow rate of 0.05 mL/min (87 cm/h) for 30 min. The effluent was monitored by absorbance at 280 nm. The NaOH wash fraction was collected and analyzed spectrophotometrically at 280 nm to determine the amount of tryptophan leached.

6.2.4. Surface-chemistry Modification

Two hundred milligrams of Toyopearl AF-Amino-650M was swollen in 20% v/v methanol for 2 h and then rinsed with anhydrous DMF. The resin was reacted with Boc-Alanine via HCTU chemistry. An anhydrous DMF solution (1 mL) of Boc-Ala-OH (45.4 mg, 3 eq.), HCTU (99.3 mg, 3 eq.) and DIPEA (83.6 µL, 6 eq.) was added to the resin. The mixture was shaken for 3 h and then the resin was washed with DMF. Further couplings were repeated to saturate all the available amino groups, as monitored by Kaiser test. The resin was dry-packed in 30 mm×2.1 mm I.D. Microbore column (0.1 mL) and swollen in 20% v/v methanol. After equilibration with PBS pH 7.4, 0.1 M NaOH was flown through the column to remove the Boc-alanine coupled through ester bonds. The resin was split into two batches, (a) and (b), and rinsed with DMF. Acetylation was carried out only on batch (a) with acetic Anhydride—DIPEA (1:1, 2 mL, 3×30 min), while batch (b) was kept non-acetylated. Boc protection was then removed from both resins by TFA in DCM (1:1, 2 mL, 2×30 min) and the amino groups were free-based by triethylamine (TEA) in DMF (1:1, 2 mL, 2×15 min). A Kaiser test was performed to check the presence of free amino groups available for coupling. Fmoc-tryptophan was coupled on both resins via HCTU chemistry. An anhydrous DMF solution (1 mL)) of Fmoc-Trp-OH (51.2 mg, 3 eq.), HCTU (49.6 mg, 3 eq.) and diisopropylethylamine (DIPEA) (41.8 µL, 6 eq.) was added to the resins. The mixture was shaken for 3 h and the resin was washed with DMF. Further couplings were repeated to saturate all the available amino groups, as monitored by Kaiser test. The same coupling was also performed on unmodified Toyopearl AF-Amino-650M to produce the batch (c) used as control. The amino acid density was estimated on the three resins by Fmoc quantification as described in Section 6.2.3. The difference in amino acid density between batch (b) and (a) was considered as a measure of the amount of amino acid coupled through ester bonds. To determine the NaOH stability of the resins, 35 mg of each resin batch were dry-packed in 30 mm×2.1 mm I.D. Microbore columns (0.1 mL). The resin was swollen with 20% methanol and then rinsed with PBS pH 7.4. Aqueous 0.1 M NaOH at the flow rate of 0.05 mL/min (87 cm/hr) was passed for 30 min. The effluent was monitored by absorbance at 280 nm.

6.2.5. Alternative Surface Modification Chemistry

Two hundred milligrams of Toyopearl HW-65F resin was swollen in 20% v/v methanol for 2 h and then rinsed with anhydrous DMF. A 2 mL of 50% v/v resin slurry in anhydrous DMF was mixed with 385 mg of carbonyl diimidazole (CDI). The reaction was carried out for 1 h at room temperature in mild shaking. The activated resin was thoroughly washed to remove the unreacted CDI. The resin was reacted with (mono)Boc-diaminoethane (Boc-DAE). A DMF solution (1.5 mL) of 150 mg of Boc-DAE was added to the resin. The mixture was shaken overnight at 45° C. and then the resin was washed with DMF. The resin was then split into two batches, (a) and (b). Acetylation was carried out only on batch (a) with acetic anhydride—DIPEA (1:1, 2 mL, 3×30 min), while batch (b) was kept non-acetylated. Boc deprotection, Fmoc-tryptophan coupling, estimation of amino acid densities of resins (a) and (b) and NaOH stability testing were performed according to same procedure as described in Sections 6.2.3 and 6.2.4.

6.2.6. Synthesis of HWRGWV (SEQ ID NO: 1) on Modified Toyopearl AF-amino-650M and CIP Test The ligand HWRGWV (SEQ ID NO: 1) was synthesized at the density of 0.11 meq/g on modified Toyopearl AF-Amino-650M resin via conventional Fmoc coupling chemistry. The Toyopearl AF-Amino-650M resin was modified according to the procedure described in Section 6.2.4. This peptide resin was packed in a column and utilized for repeated cycles of IgG purification, each followed by alkaline cleaning as described in Section 6.2.1. The column was regenerated for 200 cycles with aqueous 0.1M NaOH and for 100 and 50 cycles with aqueous 0.5M NaOH and 1M NaOH respectively.

6.2.7. Sample Analysis for Yields and Purities

The amount of IgG in the collected fractions was quantitated by HPLC using a 1-mL HiTrap Protein G column. The yield of IgG was calculated as the ratio of IgG eluted to total IgG loaded. The purity of IgG in the eluted fractions was determined by sodium dodecyl sulphate polyacrylamide gel electrophoresis (SDS-PAGE) under reducing conditions, as described by Yang et al. (Yang et al. 2005; Yang H. Gurgel P. V., and Carbonell R. G. (2009)) using NuPAGE® Novex 4-12% Bis-Tris gels in a Xcell SuperLock™ Mini-Cell system (Invitrogen, CA, USA). Sample preparation was done by adding 5 µL of NuPAGE® LDS buffer and 2 µL of NuPAGE® reducing agent to 13 µL of sample and boiling the resulting mixture for 10 min. Gels were Coomassie-stained by using SimpleBlue™ SafeStain. The IgG purity was determined by densitometric analysis of Coomassie-stained gels by means of ImageJ 1.32j software (National Institute of Health, MD, USA). The purity of the product was calculated as the fraction of the total area equivalent to the IgG bands at 25 and 50 KDa.

6.3. Results

6.3.1. Stability of Commercial HWRGWV-Toyopearl Resin to 0.1M NaOH

Five cycles of purification of IgG from cMEM were performed by using the peptide resin HWRGWV-Toyopearl produced by direct on-resin peptide synthesis via conventional chemistry. Regeneration between the first and second cycle was performed with 0.85% v/v phosphoric acid, as described in previous work (A. D. Naik et al., 2011), while 0.1M NaOH was used in the following four cycles. The flow-through and elution fractions of the five cycles were collected and analyzed by Protein G chromatography and SDS-PAGE to determine product yield and purity. Results are reported in Table 1. The yield and purity of IgG from the first and second cycle were almost equal, being 85% and 91% respectively. However, after the first NaOH wash the resin exhibited a sharp decrease in IgG binding capacity. The alkaline wash was found to cause a massive ligand loss, which produced the very high peak observed during the NaOH regeneration, as reported in FIG. 1(A) ($2^{nd}$ cycle). The product yield showed a 4-fold reduction, from 85% to 23% (Table 1). This is also indicated by the SDS-PAGE reported in FIG. 1(C), which shows that a considerable amount of IgG was found in the flow-through after the first alkaline wash (lane 4), and by the evident increase of the flow-through peak in the chromatograms reported in FIG. 1(B). Unlike yield, however, an almost negligible decrease in IgG purity was detected (from 91% to 90%). Furthermore, the following alkaline washes did not further affect the resin performance, as both yield and purity remained constant over the following cycles, respectively at the values of 21% and 90% (Table 1). This indicates that upon alkaline wash, the adsorbent loses only binding capacity but not selectivity towards IgG.

TABLE 1

IgG yield and purity of the four cycles of purification using HWRGWV-Toyopearl resin with intermediate NaOH wash.

| Cycle | IgG yield | IgG purity |
|---|---|---|
| 1 | 85% | 92% |
| 2 | 85% | 91% |
| 3 | 23% | 90% |
| 4 | 21% | 90% |
| 5 | 21% | 90% |

In order to determine the extent of ligand loss, three cycles with blank injection were performed on a column packed with fresh resin by applying the same chromatographic protocol. The NaOH washes were collected and analyzed by C18 HPLC to determine the mass of ligand removed from the resin. Results are reported in Table 2. While the first alkaline wash resulted in a 43% loss of ligand, following washes were found to remove only small amounts of peptide. This result agrees with the previous findings, indicating that the loss of resin performance is mainly caused by the first alkaline wash.

TABLE 2

Extent of ligand leaching with increasing number of 0.1M NaOH wash.

| NaOH wash | Mass of leached HWRGWV (mg) | Density of HWRGWV on the resin (meq/g) | % Overall Ligand loss |
|---|---|---|---|
| 0 | — | 0.15 | — |
| 1 | 1.88 | 0.086 | 43% |
| 2 | 0.088 | 0.083 | 45% |
| 3 | 0.059 | 0.081 | 46% |

6.3.2. Study of Stability Per Se of the Ligand

The ligand loss in alkaline conditions reported above is either due to the chemical instability of the ligand per se or to the lability of the bond between the ligand and the resin. A study of the ligand stability in alkaline conditions was performed by exposing the peptide to different NaOH concentrations for different time intervals. FIG. 2(A) and FIG. 2(B) show the C18 HPLC analysis of HWRGWV (SEQ ID NO: 1) exposed to different NaOH concentrations viz. 0.1 M, 0.5 M and 1 M over 1 h (FIG. 2(A)) and 2 h (FIG. 2(B)). The results showed that the ligand was not affected by NaOH even at concentrations up to 1 M and exposure time of 1 h, thus suggesting that the peptide per se is chemically stable. Similar results were obtained by the MALDI-TOF MS analysis of the samples (data not shown). It is hence concluded that the loss of resin performance is not due to peptide degradation but rather to the cleavage of the whole ligand from the resin surface. This is also consistent with the previous finding that the alkaline wash does not lower the product purity, but only the recovery.

6.3.3. Determination of the Amount of Ester Bonds

The results presented in sections 6.3.1 and 6.3.2 indicated that a considerable amount of peptides are coupled to the resin via alkaline-labile bonds. This is due to the nature of the functional groups present on the resin and to the mechanism of peptide synthesis. During on-resin peptide synthesis the carboxyl terminus of the N-protected incoming amino acid is activated in solution and reacts with the nucleophilic groups located on the resin surface (Step 1, Scheme 10 below). N. Leo Benoiton, *Chemistry of peptide synthesis*, 2006 Taylor & Francis. Toyopearl AF-Amino-650M resin, as well as any other amino resin for chromatography, bears two kinds of nucleophilic groups, viz. amino and hydroxyl. www.separations.us.tosohbioscience.com/Products/ProcessMedia/By-Mode?AFC/ToyopearlAF-Amino-650.htm. The activated carboxyl terminus of the first amino acid binds partly to the amino and partly to the hydroxyl groups, respectively through amide and ester bonds (Step 2). The synthesis proceeds with the subsequent amino acids thus leading to two populations of peptides, one coupled via amide bonds and the other via ester bonds. The latter, however, are readily hydrolyzed in alkaline conditions and are responsible for the ligand leaching during the NaOH wash (Step 3). This mechanism is shown below.

Scheme 10: Mechanism of peptide synthesis on Toyopearl AF-Amino-650M resins and ligand leaching in alkaline conditions.

Step 1. Liquid-phase activation of N-protected amino acid

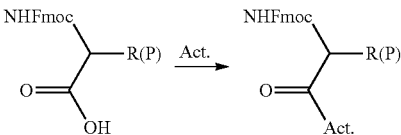

Step 2. Amino acid coupling on amino and hydroxyl groups through amide and ester bonds respectively

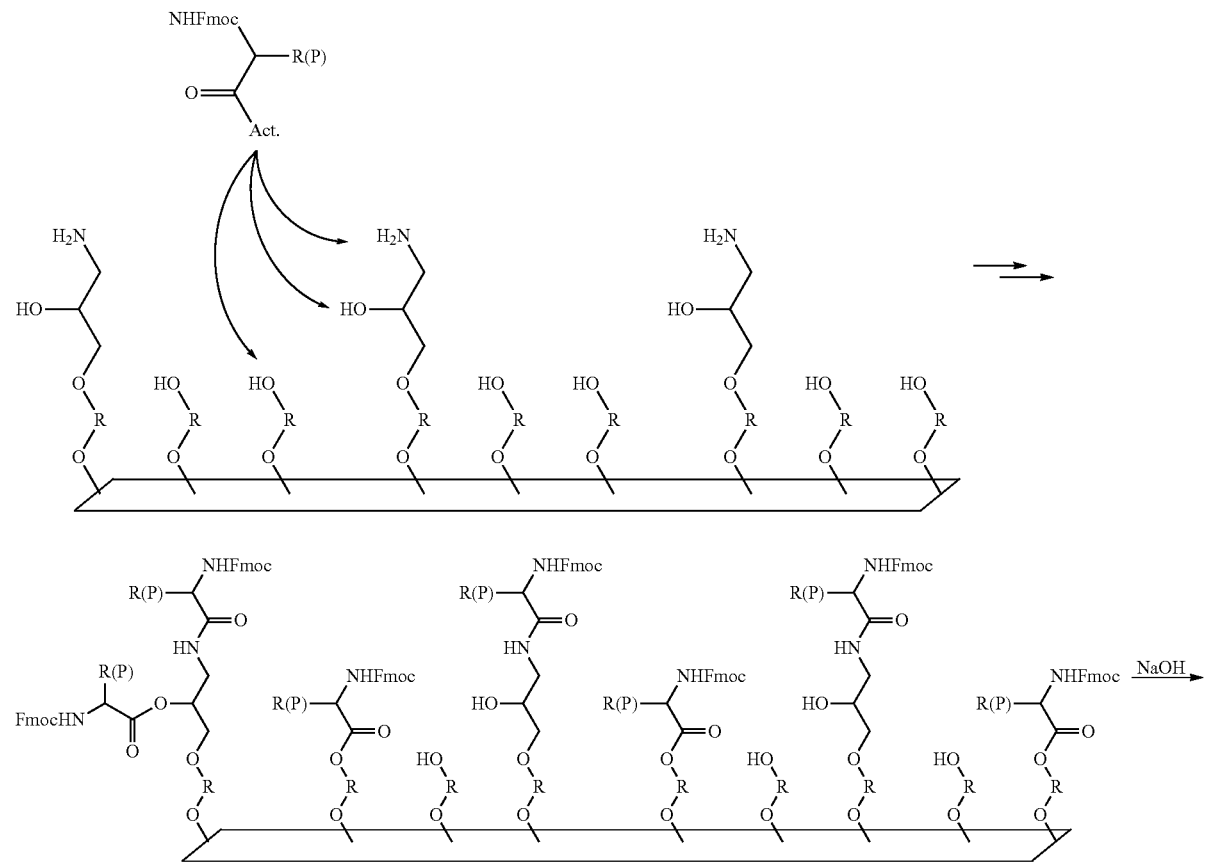

Step 3. Amino acid/peptide cleavage in alkaline conditions

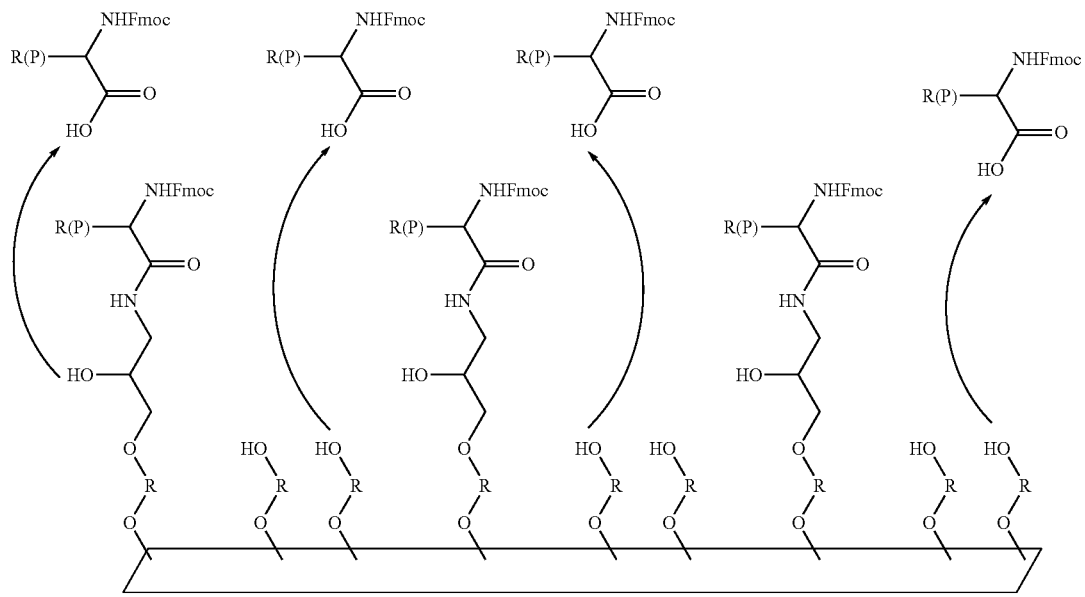

It was therefore decided to estimate the amount of amide and ester bonds formed during the solid phase peptide synthesis. This was performed by coupling tryptophan to Toyopearl AF-Amino-650M and Toyopearl HW-65F resins and estimating the amino acid density on each of the resins. While the first resin bears both amino and hydroxyl groups, the second one bears only hydroxyl groups. Therefore, tryptophan was coupled on Toyopearl AF-Amino-650M via both amide and ester bonds and on Toyopearl HW-65F only via ester bond. The amino acid density on these resins, measured by Fmoc quantification, was found to be 0.44 meq/g and 0.17 meq/g respectively (Table 3). Their difference (0.27 meq/g) was considered to represent the amount of amino acid coupled through amide bonds. Consequently, it was estimated that ester bonds make up 38.6% of the total.

The two resin batches were then subjected to alkaline wash (with 0.1 M NaOH) and the amount of tryptophan leached was determined by spectrophotometric analysis of the alkaline flow-through fractions at 280 nm Results are reported in Table 4. The fraction of the coupled tryptophan which was leached by 0.1M NaOH (38.2%) was hence regarded as the amount of amino acid coupled by ester bonds.

TABLE 3

Determination of the amount of tryptophan coupled through ester bond via Fmoc quantification.

| Resin | Density of Trp on the resin (meq/g) | % of Trp coupled by ester bonds |
|---|---|---|
| Toyopearl AF-Amino-650M | 0.44 | 38.6% |
| Toyopearl HW-65F | 0.17 | 100% |

TABLE 4

Determination of the amount of tryptophan coupled through ester bond via quantification of amino acid leaching.

| Resin | Density of Trp on the resin (meq/g) | Mass of Trp on the resin* (mg) | Mass of Trp leached (mg) | % of Trp coupled by ester bonds |
|---|---|---|---|---|
| Toyopearl AF-Amino-650M | 0.44 | 3.145 | 1.201 | 38.2% |
| Toyopearl HW-65F | 0.17 | 1.215 | 1.210 | 99.6% |

*Referred to the amount of resin packed in a column (35 mg).

Results reported in Table 3 and Table 4 agree in indicating that approximately 40% of the amino acids (or peptides) are coupled by ester bonds. This remarkably high amount of ester bonds is due to the strength of the coupling protocol, which involves repeated reactions with high excess of amino acid and coupling agent. These conditions are however necessary to provide the adsorbent with a ligand density sufficient to guarantee an appropriate binding capacity. It was then concluded that the hydroxyl groups are to be capped prior to peptide synthesis in order to have the ligand coupled exclusively by amide bonds. Furthermore, the capping is to be reversible, in order to restore the resin hydrophilicity after the synthesis is completed.

6.3.4. Surface Chemistry Modification (Resins Containing Both Hydroxyl and Amino Groups)

Another solution for synthesizing alkaline stable peptide adsorbents consists in modifying the resin surface chemistry by (i) activating the base matrix, (ii) selectively blocking the hydroxyl groups and (iii) performing the peptide synthesis exclusively on amino groups through alkaline-stable amide bonds. This method has five steps:

1. Introduction of Boc-protected amino groups: Boc-alanine is coupled to Toyopearl AF-Amino-650M resin, partly by amide and partly by ester bonds. The ester bonds are then hydrolyzed by means of an alkaline wash (0.5 M NaOH), leaving on the resin only the Boc-alanine coupled through amide bonds. In alternative, base Toyopearl HW-65F resin, which bears only hydroxyl groups, is activated (e.g., with carbonyl diimidazole, tosyl chloride or epichlorohydrin) and reacted with Boc-diaminoethane.

2. Capping of hydroxyl groups. The hydroxyl groups are capped by acylation.

3. Deprotection of amino groups. The Boc protection is removed by the appropriate cleaving solution and the amino groups are free-based. The resin thus bears free amino groups and acylated hydroxyl groups.

4. Peptide synthesis. The peptide is synthesized exclusively on amino groups.

5. Decapping of hydroxyl groups. After the peptide synthesis is completed, a second alkaline wash (0.5 M NaOH) is performed to remove the acylation from the hydroxyl groups and clean the resin.

Scheme 11: Protocol of surface chemistry modification (Steps 1-5).

Step 1/a. Introduction of Boc-protected amino groups (via Boc-alanine)

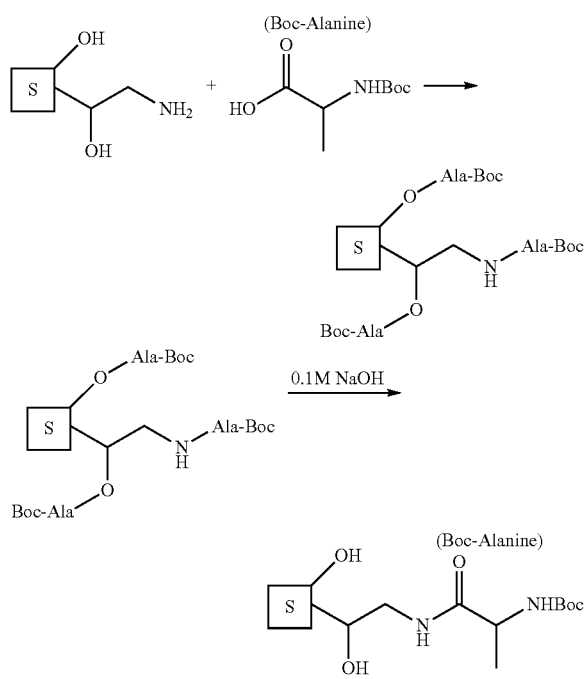

Step 1/b (alternative). Introduction of Boc-protected amino groups (via Boc-diaminoethane)

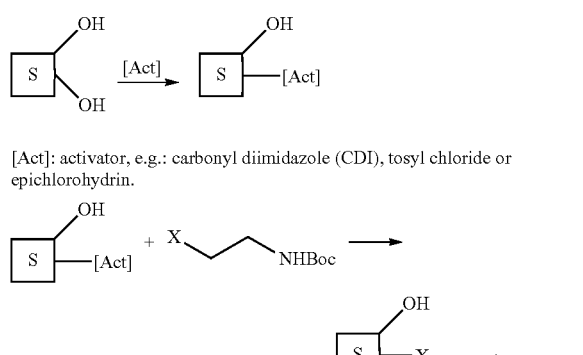

[Act]: activator, e.g.: carbonyl diimidazole (CDI), tosyl chloride or epichlorohydrin.

X: group reactive towards (Act) and yielding an alkaline-stable bond, e.g.: —NH₂, —SH.

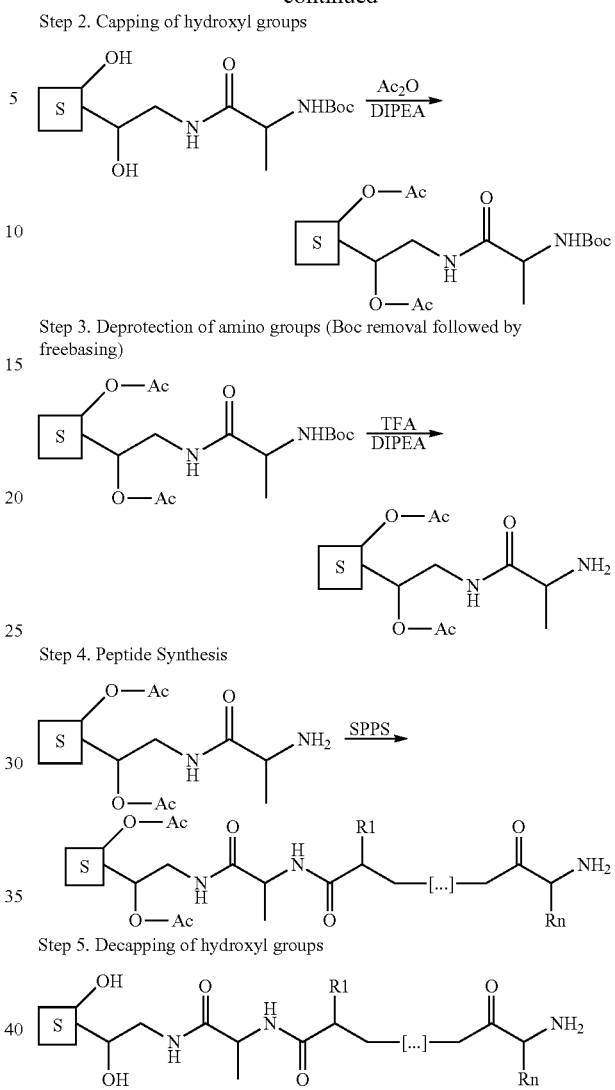

The presented strategy has some flexibility. The protocol does not require Boc-Alanine specifically, as it can be carried out with any other similar molecule. Alanine was chosen because it is usually employed as a spacer amino acid on which the peptides are synthesized. Also, α-amino-protecting groups other than Boc can be used, such as Z (benzyloxycarbonyl), provided that they are base stable. Boc was chosen for this study because it is readily available and easily removable in acid conditions. Finally, the acylation of hydroxyl groups can be performed with a variety of agents, such as acetic anhydride, acetyl chloride or benzyl chloride.

This protocol of surface chemistry modification was first tested with a single amino acid (tryptophan). Three batches were prepared on Toyopearl AF-Amino-650M resin. Batch (a) was prepared by following the whole synthetic procedure, while batches (b) and (c) were made as controls. Sample (b) was not acetylated before the Boc removal, while sample (c) was prepared by direct coupling on the unmodified amino resin. The amino acid density was measured by Fmoc quantitation. Batch (a) had a density of 0.25 meq/g, while resins (b) and (c) had densities of 0.42 meq/g and 0.44 meq/g, respectively. An alkaline wash with 0.1 M NaOH was performed on-column on the three batches of resin. As can be seen from the chromatograms (FIG. 3), a negligible amount of tryptophan was leached from batch (a), while non-acetylated batch (b) and unmodified batch (c) showed an equally large amino acid leakage. These results indicate that the method presented is effective in achieving the resin stability toward alkaline CIP treatments and that the capping of hydroxyl groups before amino acid coupling is a critical step. This was also confirmed by the values of amino acid density of the three resins. Batch (a) had 40% lower amino acid density than Batch (b) and Batch (c). This correlated well with results presented in Section 6.3.3 where the amount of ester bonds formed was estimated to be approximately 40% of the total.

6.3.5. Alternative Surface Chemistry Modification (Resins Containing Only Hydroxyl Groups)

An alternative protocol of surface chemistry modification was performed on a base Toyopearl HW-65F resin, which bears only hydroxyl groups. After activation by CDI chemistry, the resin was reacted with Boc-diaminoethane to introduce protected amino groups on the resin (Protocol, step 1/b). As before, two batches of resin were prepared, (a) and (b), the latter being unacetylated before the Boc removal. The chromatographic results (FIG. 4) of the 0.1 M NaOH wash performed on the two resins are similar to those presented in section 3.4, proving that, as far as alkaline stability is concerned, the protocols are equally effective.

6.4. Resin Activation

The next set of experiments is directed to improve the peptide density on the resin thereby increasing the binding capacity. Several activation chemistries were applied to Toyopearl HW 65 and Sepharose 6B to achieve high functional density. As all the protocols are amine reactive, benzylamine was chosen as ligand for the ease of detection and quantification by spectrophotometry at 250 nm ($\epsilon=1.38\times10^4$ $M^{-1}$ $cm^{-1}$). The amount of coupled benzylamine was determined via mass balance by measuring the unreacted amount.

6.4.1. Carbonyl Diimidazole (CDI) Activation 200 mg of Toyopearl HW 65 was swollen in 20% methanol and sequentially washed by methanol, DMF and finally anhydrous DMF. 2 mL of 50% slurry in ahydrous DMF was mixed with 385 mg of CDI. The reaction was carried out for 1 hour at room temperature. The activated resin was then thoroughly washed to remove unreacted CDI. To this activated resin 0.2 ml of benzylamine dissolved in 1 ml of DMF was added. The mixture was rotated overnight at room temperature. The amount of coupled benzylamine was found to be 0.76 meq/g.

6.4.2. Tosyl Chloride Activation 200 mg of Toyopearl HW 65 resin was swollen and washed as above. 240 mg of Tosyl chloride was dissolved in 1 ml of DMF and added to 2 ml of 50% resin slurry. 0.2 ml of pyridine was also added to neutralize the HCl formed. The reaction was carried for 1 hour at room temperature. After the reaction the resins were thoroughly washed with DMF. To this activated resin 0.2 ml of benzylamine dissolved in 1 ml of DMF was added. The mixture was rotated overnight at room temperature. The amount of coupled benzylamine was found to be 0.82 meq/g.

6.5. Epichlorohydrin Activation 200 mg of Toyopearl HW 65 resin was swollen and washed as above. 0.15 ml of 15M NaOH and 0.25 ml of epichlorohydrin were added to 2 ml of 50% resin slurry. The reaction was carried for 1 hour at 50° C. After the reaction the resins were thoroughly washed with DMF. To this activated resin 0.2 ml of benzylamine dissolved in 1 ml of DMF was added. The mixture was rotated overnight at room temperature. The amount of coupled benzylamine was found to be 0.97 meq/g.

The same protocols were applied to Sepharose 6B. As Sepharose 6B is not stable in DMF for long period of time, acetone was used as solvent. The CDI activation gave a value of 0.42 meq/g, tosyl chloride gave 0.4 meq/g and epichlorohydrin gave 0.7 meq/g.

Thus with these chemistries it is possible to achieve functional densities which are significantly higher than the ones showed by commercially available resin.

This data shows that the proposed strategies of activation of base matrixes and subsequent surface chemistry modification have a tremendous potential to the achievement of an alkaline-stable peptide-based absorbent characterized with high capacity and specificity for IgG.

6.6. Testing Alkaline Stability and Performance of HWRGWV (SEQ ID NO: 1) Synthesized on Modified Toyopearl AF-amino-650M HWRGWV (SEQ ID NO: 1) was synthesized via Fmoc-coupling chemistry on Toyopearl AF-Amino 650M resin modified according to procedure described in Section 3.4. The peptide adsorbent was tested for its alkaline stability by performing repeated cycles of IgG purification from cMEM, each followed by an alkaline cleaning with aqueous NaOH. Two hundred cycles were performed employing 0.1 M NaOH, 100 cycles employing 0.5 M NaOH and 50 cycles employing 1 M NaOH. Chromatograms and SDS-PAGE of the collected fractions are reported in FIGS. 5(A), 5(B), 6(A), 6(B), 7(A), and 7(B) while the IgG yield and purity are reported in Tables 5-7.

TABLE 5

IgG yield and purity from different purification cycles using HWRGWV (SEQ ID NO: 1) synthesized on modified Toyopearl resin. Cleaning was performed with aqueous 0.1M NaOH.

| Cycle # (0.1M NaOH wash #) | IgG yield | IgG purity |
|---|---|---|
| 1 (0) | 91% | 96% |
| 25 (24) | 90% | 95% |
| 50 (49) | 88% | 94% |
| 100 (99) | 87% | 94% |
| 200 (199) | 85% | 93% |

TABLE 6

IgG yield and purity from different purification cycles using HWRGWV (SEQ ID NO: 1) synthesized on modified Toyopearl resin. Cleaning was performed with aqueous 0.5M NaOH.

| Cycle # (0.5M NaOH wash #) | IgG yield | IgG purity |
|---|---|---|
| 1 (0) | 89% | 98% |
| 25 (24) | 87% | 97% |
| 50 (49) | 85% | 96% |
| 75 (74) | 82% | 95% |
| 100 (99) | 80% | 95% |

TABLE 7

IgG yield and purity from different purification cycles using HWRGWV (SEQ ID NO: 1) synthesized on modified Toyopearl resin. Cleaning was performed with aqueous 1M NaOH.

| Cycle # (1M NaOH wash #) | IgG yield | IgG purity |
|---|---|---|
| 1 (0) | 88% | 96% |
| 10 (9) | 84% | 95% |

TABLE 7-continued

IgG yield and purity from different purification cycles using HWRGWV (SEQ ID NO: 1) synthesized on modified Toyopearl resin. Cleaning was performed with aqueous 1M NaOH.

| Cycle # (1M NaOH wash #) | IgG yield | IgG purity |
|---|---|---|
| 20 (19) | 82% | 93% |
| 30 (29) | 79% | 93% |
| 50 (49) | 76% | 94% |

These results indicate that the affinity adsorbent can be reused for a high number of cycles without showing any appreciable loss in binding capacity or selectivity, regardless of the concentration of the alkaline cleaning solution. The yield and purity of IgG purified from a complex mixture remain approximately constant and their slight decrease is just due to the normal resin decline with the reuse. Also the performance of the peptide-based affinity adsorbent is comparable to that reported for Protein A matrices. K. Brorson et al., 2003; R. Hahn et al. 2006. Two commercial Protein A resins, MabSelect Xtra and Protein A Sepharose 4 Fast Flow (GE Healthcare), were used for 200 purification cycles involving cleaning with 0.1M NaOH without appreciable loss in IgG yield and purity.

6.7. Conclusions

A method of surface chemistry modification of chromatographic resins was presented for the production of alkaline stable peptide-based affinity adsorbents. A case study based on an IgG affinity adsorbent-HWRGWV-Toyopearl resin demonstrated that the adsorbent can be cleaned with aqueous NaOH at different concentrations (0.1 M, 0.5 M and 1 M) and reused for high number of purification cycles without a significant loss in product yield and purity. This performance is comparable to that reported for commercialized Protein A-based resins. Providing adsorbents characterized by long life time reduces the manufacturing costs and ultimately the product price.

The method applies to the preparation of affinity adsorbents by on-resin peptide synthesis via conventional Fmoc/tBoc chemistry. This approach is efficient, economical and secures the successful development of the peptide-based adsorbent, as the ligand is identified within a library which is synthesized on the same matrix as used for the chromatographic purification.

Furthermore, the proposed technique consists in only one additional step before the peptide synthesis. It is a very efficient and easily controlled reaction, inexpensive and does not require any additional equipment. It does not affect the properties of the resin for affinity chromatography and also does not influence the performance of the peptide ligand. Also this technique is universal, being valid for any peptide sequence identified for the purification of a desired biopharmaceutical target. See also, Menegatti et al., 2012 *J Chrom A* 1245 55-64, the contents of which are hereby incorporated in its entirety.

It is to be understood that, while the invention has been described in conjunction with the detailed description, thereof, the foregoing description is intended to illustrate and not limit the scope of the invention. Other aspects, advantages, and modifications of the invention are within the scope of the claims set forth below. All publications, patents, and patent applications cited in this specification are herein incorporated by reference as if each individual publication or patent application was specifically and individually indicated to be incorporated by reference.

What is claimed is:

1. A method of preparing an alkaline-stable functionalized solid support which comprises:
   (a) contacting a solid support comprising nucleophilic groups which are hydroxyl groups and which may further comprise additional nucleophilic groups which are different than hydroxyl groups, under suitable conditions with an alkaline-stable protected (i) biomonomer or (ii) biopolymer protected with a alkaline-stable protecting group so as to form a coupled solid support;
   (b) reacting the coupled solid support under suitable conditions so as to cleave any alkaline-labile bonds formed in step (a) between the hydroxyl group and the alkaline-stable protected (i) biomonomer or (ii) biopolymer;
   (c) acylating the hydroxyl groups in the coupled solid support to form an acylated coupled solid support;
   (d) removing the alkaline-stable protecting group from the biomonomer or biopolymer to yield a deprotected biomonomer or biopolymer on the acylated coupled solid support;
   (e) contacting the acylated coupled solid support with suitable reagents so as to link at least one additional protected biomonomer or biopolymer to the deprotected biomonomer or biopolymer on the acylated coupled solid support; and
   (f) deacylating the acylated coupled solid support so as to form the alkaline-stable functionalized solid support.

2. The method of claim 1, wherein the alkaline-stable functionalized solid support is stable to alkaline conditions up to about 1.0 M NaOH.

3. The method of claim 1, wherein acylating is performed by an anhydride or an acyl halide.

4. The method of claim 3, wherein the anhydride or the acyl halide is acetic anhydride, acetyl chloride, benzoic anhydride, or benzyl chloride.

5. The method of claim 1, wherein step (e) is repeated so as add a plurality of protected biomonomers to the acylated coupled solid support.

6. The method of claim 5, wherein the protected biomonomers are protected amino acids, nucleic acids, or saccharides.

7. The method of claim 1, wherein the nucleophilic groups which are different than hydroxyl groups on the solid support are free amino groups or free thiol groups.

8. The method of claim 1, wherein the solid support is a hydroxylated acrylic solid support or a hydroxylated polymer solid support.

9. The method of claim 1, wherein the alkaline-labile bonds are ester bonds.

10. An alkaline-stable functionalized solid support for affinity chromatography prepared by the method of claim 1.

11. The method of claim 1, wherein the nucleophilic groups in step (a) are hydroxyl groups; and prior to contacting the solid support in step (a) with the alkaline-stable protected biomonomer or biopolymer, reacting the solid support with an activating agent so as to form an activated solid support comprising unreacted hydroxyl groups and activated hydroxyl groups; and the hydroxyl groups in step (c) are the unreacted hydroxyl groups.

12. An alkaline-stable functionalized solid support for diagnostics prepared by the method of claim 1.

* * * * *